US012365090B2

(12) United States Patent
Gildert

(10) Patent No.: US 12,365,090 B2
(45) Date of Patent: *Jul. 22, 2025

(54) ROBOTS, TELEOPERATION SYSTEMS, AND METHODS OF OPERATING THE SAME

(71) Applicant: Sanctuary Cognitive Systems Corporation, Vancouver (CA)

(72) Inventor: Suzanne Gildert, Vancouver (CA)

(73) Assignee: Sanctuary Cognitive Systems Corporation, Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/117,205

(22) Filed: Mar. 3, 2023

(65) Prior Publication Data
US 2023/0278201 A1    Sep. 7, 2023

Related U.S. Application Data

(60) Provisional application No. 63/316,693, filed on Mar. 4, 2022.

(51) Int. Cl.
*B25J 9/16* (2006.01)

(52) U.S. Cl.
CPC .......... *B25J 9/1689* (2013.01); *B25J 9/161* (2013.01); *B25J 9/163* (2013.01); *B25J 9/1653* (2013.01); *B25J 9/1694* (2013.01); *B25J 9/1674* (2013.01); *G05B 2219/39212* (2013.01); *G05B 2219/40153* (2013.01)

(58) Field of Classification Search
CPC ........ B25J 9/163; B25J 9/1674; B25J 9/1689; G05B 2219/39212; G05B 2219/40153; G05D 1/0061
See application file for complete search history.

(56) References Cited

U.S. PATENT DOCUMENTS

| 2009/0234499 A1* | 9/2009 | Nielsen | B25J 9/161 700/250 |
| 2014/0163730 A1* | 6/2014 | Mian | B25J 9/16 700/248 |
| 2015/0224638 A1* | 8/2015 | Dockter | B25J 9/1689 700/264 |

(Continued)

FOREIGN PATENT DOCUMENTS

| DE | 102016005026 | 5/2017 |
| WO | 2015154172 A1 | 10/2015 |

OTHER PUBLICATIONS

Canadian Intellectual Property Office, International Search Report of PCT/CA2023/050286, Apr. 14, 2023.

*Primary Examiner* — Abby Y Lin
*Assistant Examiner* — Karston G. Evans
(74) *Attorney, Agent, or Firm* — Thomas Mahon; Adenike Adebiyi

(57) ABSTRACT

The present disclosure describes robots, tele-operation systems, methods, and computer program products where a robot is selectively operable in a plurality of control modes. Based on identification of a fault condition (when the robot fails to act in a suitable or sufficient manner), a control mode of the robot can be changed to provide a human operator with more explicit control over the robot. In this way, the fault condition can be resolved by human operator input, and the control modes, AI, or control paradigm for the robot can be trained to perform better in the future.

12 Claims, 4 Drawing Sheets

(56) References Cited

U.S. PATENT DOCUMENTS

| | | |
|---|---|---|
| 2017/0151667 A1 | 6/2017 | Bergstra et al. |
| 2018/0250829 A1* | 9/2018 | Hashimoto ............ B25J 9/1633 |
| 2019/0001489 A1* | 1/2019 | Hudson ................. G06N 3/045 |
| 2019/0009414 A1 | 1/2019 | Lipay et al. |
| 2019/0291277 A1* | 9/2019 | Oleynik ................ B25J 9/1669 |
| 2019/0339693 A1* | 11/2019 | Menon ................. G05D 1/0027 |
| 2019/0359424 A1* | 11/2019 | Avraham ............... G06Q 50/28 |
| 2020/0298408 A1* | 9/2020 | Hashimoto ............ B25J 9/1674 |
| 2020/0316782 A1 | 10/2020 | Chavez et al. |
| 2020/0368912 A1* | 11/2020 | Murty ................... B25J 9/1666 |
| 2021/0205986 A1* | 7/2021 | Kalouche ................ B25J 9/163 |
| 2021/0255618 A1* | 8/2021 | Lenz ................... G05D 1/0027 |
| 2021/0394359 A1* | 12/2021 | Mathieu ................ B25J 9/1661 |
| 2022/0218427 A1* | 7/2022 | Tomatsu ................ G16H 20/40 |
| 2022/0348409 A1* | 11/2022 | Sun ........................ B25J 9/0093 |

\* cited by examiner

ROBOTS, TELEOPERATION SYSTEMS, AND METHODS OF OPERATING THE SAME

TECHNICAL FIELD

The present robots, tele-operation systems, computer program products, and methods generally relate to controlling operation of said robots, tele-operation systems, and computer program products using said methods, and particularly relate to selecting and changing between control modes for robot operation.

BACKGROUND

Robots can be controlled or monitored via a tele-operation system. A tele-operation system refers to a system which can receive input from at least one operator, and generally communicates with at least one robot remotely. Exemplary tele-operation systems could include a monitoring station in a warehouse, a VR suit, or a control panel, though many different variations of tele-operation system are possible. Remote communication can be short-range, such as via RF or optical communication or over a local network, or can be long-range, such as over broad networks like the internet.

Such control of a robot preferably leaves some decision-making in the purview of the robot, such that a human operator is not required to manually provide input for each action a robot is to perform. However, sometimes a decision or action of a robot may be undesirable, non-ideal, or insufficient. This is particularly true when an artificial intelligence (AI) or control paradigm for a robot is relatively new, untrained, or insufficiently trained. Even for thoroughly trained and experienced artificial intelligence or robot control paradigms, situations can still arise where decisions or actions of a robot are undesirable, non-ideal, or insufficient.

It is desirable to provide a means for enabling human intervention or input when a robot's decisions or actions are undesirable, non-ideal, or insufficient.

BRIEF SUMMARY

According to a broad aspect, the present disclosure describes a method of operating a robot, the robot comprising at least one processor and a communication interface that communicatively couples the at least one processor to a tele-operation system, the robot selectively operable in a plurality of control modes including a first control mode that corresponds to a first level of robot autonomy and at least a second control mode that corresponds to a second level of robot autonomy, the second level of robot autonomy being less autonomous than the first level of robot autonomy, the method comprising: operating the robot in the first control mode; identifying a fault condition of the robot during operation of the robot in the first control mode; in response to identifying the fault condition during operation of the robot in the first control mode, changing the control mode from the first control mode to the second control mode; and operating the robot in the second control mode, wherein operation of the robot in the second control mode requires more explicit input from an operator of the tele-operation system via the communication interface than operation of the robot in the first control mode.

The first level of robot autonomy may comprise full robot autonomy, and operating the robot in the first control mode may require no input from the operator of the tele-operation system.

The second level of robot autonomy may comprise partial robot autonomy, and operating the robot in the second control mode may comprise operating the robot based on at least one action instruction from the operator of the tele-operation system received by the communication interface, the at least one action instruction indicating at least one action to be performed by the robot. The plurality of control modes may further include a third control mode that corresponds to a third level of robot autonomy, the third level of robot autonomy being less autonomous than the second level of robot autonomy. The third level of robot autonomy may comprise no robot autonomy, and operation of the robot in the third control mode may be based on at least one movement instruction from the operator of the tele-operation system received by the communication interface, the at least one movement instruction indicating at least one movement to be emulated by at least one actuatable member of the robot.

The second level of robot autonomy may comprise no robot autonomy, and operating the robot in the second control mode may comprise operating the robot based on at least one movement instruction from the operator of the tele-operation system received by the communication interface, the at least one movement instruction indicating at least one movement to be emulated by at least one actuatable member of the robot. The plurality of control modes may further include a third control mode that corresponds to a third level of robot autonomy, the third level of robot autonomy being less autonomous than the first level of robot autonomy and more autonomous than the second level of robot autonomy. The third level of robot autonomy may comprise partial robot autonomy, and operation of the robot in the third control mode may be based on at least one action instruction from the operator of the tele-operation system received by the communication interface, the at least one action instruction indicating at least one action to be performed by the robot.

The first level of robot autonomy may comprise partial robot autonomy; operating the robot in the first control mode may comprise operating the robot based on at least one action instruction from the operator of the tele-operation system received by the communication interface, the at least one action instruction indicating at least one action to be performed by the robot; the second level of robot autonomy may comprise no robot autonomy; and operating the robot in the second control mode may comprise operating the robot based on at least one movement instruction from the operator of the tele-operation system received by the communication interface, the at least one movement instruction indicating at least one movement to be emulated by at least one actuatable member of the robot. The plurality of control modes may further include a third control mode that corresponds to a third level of robot autonomy, the third level of robot autonomy being more autonomous than the first level of robot autonomy. The third level of robot autonomy may comprise full robot autonomy, and operation of the robot in the third control mode may require no input from the operator of the tele-operation system.

The plurality of control modes may further include a third control mode that corresponds to a third level of robot autonomy, the third level of robot autonomy being less autonomous than the second level of robot autonomy, and the method may further comprise: identifying another fault condition of the robot during operation of the robot in the second control mode; in response to identifying the another fault condition during operation of the robot in the second control mode, changing the control mode from the second control mode to the third control mode; and operating the robot in the third control mode.

At least one non-transitory processor-readable storage medium accessible to the at least one processor may store the plurality of control modes; operating the robot in the first control mode may comprise: accessing, by the at least one processor, the first control mode from the at least one non-transitory processor-readable storage medium; and operating, by the at least one processor, the robot in the first control mode; and operating the robot in the second control mode may comprise: accessing, by the at least one processor, the second control mode from the at least one non-transitory processor-readable storage medium; and operating, by the at least one processor, the robot in the second control mode.

The robot may include at least one sensor; the method may further comprise capturing, by the at least one sensor, sensor data representing an environment of the robot; and identifying a fault condition of the robot may comprise identifying, by the at least one processor based on the sensor data, that the robot has failed to complete an action to be performed by the robot.

The robot may include at least one sensor; the method may further comprise capturing, by the at least one sensor, sensor data representing an environment of the robot; and identifying a fault condition of the robot may comprise identifying, by the at least one processor based on the sensor data, that the robot is unable to complete an action to be performed by the robot.

The robot may include at least one sensor; the method may further comprise capturing, by the at least one sensor, sensor data representing an environment of the robot; and identifying a fault condition of the robot may comprise identifying, by the at least one processor based on the sensor data, that the robot has improperly completed an action to be performed by the robot.

Identifying a fault condition of the robot may comprise identifying, by the at least one processor, that the at least one processor is unable to determine an action or movement to be performed by the robot.

Identifying a fault condition of the robot may comprise identifying, by the at least one processor, that the at least one processor is unable to determine an action or movement to be performed by the robot with sufficient confidence to perform the determined action or movement.

Identifying a fault condition of the robot may comprise identifying, by the at least one processor, that the robot has received operator input from the operator of the tele-operation system which indicates a fault condition of the robot.

The method may further comprise: in response to identifying the fault condition of the robot during operation of the robot in the first mode, outputting a fault indication. Outputting the fault indication may comprise sending, by the communication interface, the fault indication to be received by the tele-operation system. Outputting the fault indication may comprise outputting, by an audio output device of the robot, the fault indication.

The method may further comprise: training the first control mode based on at least input from the operator of the tele-operation system received for operating the robot in the second control mode.

According to another broad aspect, the present disclosure describes a robot selectively operable in a plurality of control modes including a first control mode that corresponds to a first level of robot autonomy and at least a second control mode that corresponds to a second level of robot autonomy, the second level of robot autonomy being less autonomous than the first level of robot autonomy, the robot comprising: at least one processor; a communication interface that communicatively couples the at least one processor to a tele-operation system; at least one non-transitory processor-readable storage medium communicatively coupled to the at least one processor, the at least one non-transitory processor-readable storage medium storing processor-executable instructions which, when executed by the at least one processor, cause the robot to: operate in the first control mode; identify a fault condition of the robot during operation of the robot in the first control mode; in response to identifying the fault condition during operation of the robot in the first control mode, change the control mode from the first control mode to the second control mode; and operate the robot in the second control mode, wherein operation of the robot in the second control mode requires more explicit input from an operator of the tele-operation system via the communication interface than operation of the robot in the first control mode.

The first level of robot autonomy may comprise full robot autonomy, and operation of the robot in the first control mode may require no input from the operator of the tele-operation system.

The second level of robot autonomy may comprise partial robot autonomy, and the processor-executable instructions which cause the robot to operate in the second control mode may cause the robot to operate based on at least one action instruction from the operator of the tele-operation system received by the communication interface, the at least one action instruction indicating at least one action to be performed by the robot. The plurality of control modes may further include a third control mode that corresponds to a third level of robot autonomy, the third level of robot autonomy being less autonomous than the second level of robot autonomy. The third level of robot autonomy may comprise no robot autonomy, and operation of the robot in the third control mode may be based on at least one movement instruction from the operator of the tele-operation system received by the communication interface, the at least one movement instruction indicating at least one movement to be emulated by at least one actuatable member of the robot.

The second level of robot autonomy may comprise no robot autonomy, and the processor-executable instructions which cause the robot to operate in the second control mode may cause the robot to operate based on at least one movement instruction from the operator of the tele-operation system received by the communication interface, the at least one movement instruction indicating at least one movement to be emulated by at least one actuatable member of the robot. The plurality of control modes may further include a third control mode that corresponds to a third level of robot autonomy, the third level of robot autonomy being less autonomous than the first level of robot autonomy and more autonomous than the second level of robot autonomy. The third level of robot autonomy may comprise partial robot autonomy, and operation of the robot in the third control mode may be based on at least one action instruction from the operator of the tele-operation system received by the communication interface, the at least one action instruction indicating at least one action to be performed by the robot.

The first level of robot autonomy may comprise partial robot autonomy; the processor-executable instructions which cause the robot to operate in the first control mode may cause the robot to operate based on at least one action instruction from the operator of the tele-operation system received by the communication interface, the at least one action instruction indicating at least one action to be performed by the robot; the second level of robot autonomy may comprise no robot autonomy; and the processor-executable instructions which cause the robot to operate in the second control mode may cause the robot to operate based on at least one movement instruction from the operator of the tele-operation system received by the communication interface, the at least one movement instruction indicating at least one movement to be emulated by at least one actuatable member of the robot. The plurality of control modes may further include a third control mode that corresponds to a third level of robot autonomy, the third level of robot autonomy being more autonomous than the first level of robot autonomy. The third level of robot autonomy may comprise full robot autonomy, and operation of the robot in the third control mode may require no input from the operator of the tele-operation system.

The plurality of control modes may further include a third control mode that corresponds to a third level of robot autonomy, the third level of robot autonomy being less autonomous than the second level of robot autonomy, and the processor-executable instructions may further cause the robot to: identify another fault condition of the robot during operation of the robot in the second control mode; in response to identifying the another fault condition during operation of the robot in the second control mode, change the control mode from the second control mode to the third control mode; and operate the robot in the third control mode.

The at least one non-transitory processor-readable storage medium may store the plurality of control modes; the processor-executable instructions which cause the robot to operate in the first control mode may cause the robot to: access, by the at least one processor, the first control mode from the at least one non-transitory processor-readable storage medium; and operate, by the at least one processor, the robot in the first control mode; and the processor-executable instructions which cause the robot to operate in the second control mode may cause the robot to: access, by the at least one processor, the second control mode from the at least one non-transitory processor-readable storage medium; and operate, by the at least one processor, the robot in the second control mode.

The robot may further comprise at least one sensor; the processor-executable instructions may further cause the robot to capture, by the at least one sensor, sensor data representing an environment of the robot; and the processor-executable instructions which cause the robot to identify a fault condition of the robot may cause the robot to: identify, by the at least one processor based on the sensor data, that the robot has failed to complete an action to be performed by the robot.

The robot may further comprise at least one sensor; the processor-executable instructions may further cause the robot to capture, by the at least one sensor, sensor data representing an environment of the robot; and the processor-executable instructions which cause the robot to identify a fault condition of the robot may cause the robot to: identify, by the at least one processor based on the sensor data, that the robot is unable to complete an action to be performed by the robot.

The robot may further comprise at least one sensor; the processor-executable instructions may further cause the robot to capture, by the at least one sensor, sensor data representing an environment of the robot; and the processor-executable instructions which cause the robot to identify a fault condition of the robot may cause the robot to: identify, by the at least one processor based on the sensor data, that the robot has improperly completed an action to be performed by the robot.

The processor-executable instructions which cause the robot to identify a fault condition of the robot may cause the robot to: identify, by the at least one processor, that the at least one processor is unable to determine an action or movement to be performed by the robot.

The processor-executable instructions which cause the at least one processor to identify a fault condition of the robot may cause the robot to: identify, by the at least one processor, that the at least one processor is unable to determine an action or movement to be performed by the robot with sufficient confidence to perform the determined action or movement.

The processor-executable instructions which cause the at least one processor to identify a fault condition of the robot may cause the robot to: identify, by the at least one processor, that the robot has received operator input from the operator of the tele-operation system which indicates a fault condition of the robot.

The processor-executable instructions may further cause the robot to: in response to identifying the fault condition of the robot during operation of the robot in the first mode, output a fault indication. The processor-executable instructions which cause the robot to output the fault indication may cause the robot to: send, by the communication interface, the fault indication to be received by the tele-operation system. The processor-executable instructions which cause the robot to output the fault indication may cause the robot to: output, by an audio output device of the robot, the fault indication.

The processor-executable instructions may further cause the robot to: train the first control mode based on at least input from the operator of the tele-operation system received for operating the robot in the second control mode.

According to yet another broad aspect, the present disclosure describes a computer program product comprising processor-executable instructions or data that, when the computer program product is stored in a non-transitory processor-readable storage medium of a robot selectively operable in a plurality of control modes including a first control mode that corresponds to a first level of robot autonomy and at least a second control mode that corresponds to a second level of robot autonomy, the second level of robot autonomy being less autonomous than the first level of robot autonomy, and the computer program product is executed by at least one processor of the robot, the at least one processor communicatively coupled to the non-transitory processor-readable storage medium, cause the robot to: operate in the first control mode; identify a fault condition of the robot during operation of the robot in the first control mode; in response to identifying the fault condition during operation of the robot in the first control mode, change the control mode from the first control mode to the second control mode; and operate the robot in the second control mode, wherein operation of the robot in the second control mode requires more explicit input from an operator of a tele-operation system communicatively coupled to the robot via a communication interface than operation of the robot in the first control mode.

The first level of robot autonomy may comprise full robot autonomy, and operation of the robot in the first control mode may require no input from the operator of the tele-operation system.

The second level of robot autonomy may comprise partial robot autonomy, and the processor-executable instructions or data of the computer program product which cause the robot to operate in the second control mode may cause the robot to operate based on at least one action instruction from the operator of the tele-operation system received by the communication interface, the at least one action instruction indicating at least one action to be performed by the robot. The plurality of control modes may further include a third control mode that corresponds to a third level of robot autonomy, the third level of robot autonomy being less autonomous than the second level of robot autonomy. The third level of robot autonomy may comprise no robot autonomy, and operation of the robot in the third control mode may be based on at least one movement instruction from the operator of the tele-operation system received by the communication interface, the at least one movement instruction indicating at least one movement to be emulated by at least one actuatable member of the robot.

The second level of robot autonomy may comprise no robot autonomy, and the processor-executable instructions or data of the computer program product which cause the robot to operate in the second control mode may cause the robot to operate based on at least one movement instruction from the operator of the tele-operation system received by the communication interface, the at least one movement instruction indicating at least one movement to be emulated by at least one actuatable member of the robot. The plurality of control modes may further include a third control mode that corresponds to a third level of robot autonomy, the third level of robot autonomy being less autonomous than the first level of robot autonomy and more autonomous than the second level of robot autonomy. The third level of robot autonomy may comprise partial robot autonomy, and operation of the robot in the third control mode may be based on at least one action instruction from the operator of the tele-operation system received by the communication interface, the at least one action instruction indicating at least one action to be performed by the robot.

The first level of robot autonomy may comprise partial robot autonomy; the processor-executable instructions or data of the computer program product which cause the robot to operate in the first control mode may cause the robot to operate based on at least one action instruction from the operator of the tele-operation system received by the communication interface, the at least one action instruction indicating at least one action to be performed by the robot; the second level of robot autonomy may comprise no robot autonomy; and the processor-executable instructions or data of the computer program product which cause the robot to operate in the second control mode may cause the robot to operate based on at least one movement instruction from the operator of the tele-operation system received by the communication interface, the at least one movement instruction indicating at least one movement to be emulated by at least one actuatable member of the robot. The plurality of control modes may further include a third control mode that corresponds to a third level of robot autonomy, the third level of robot autonomy being more autonomous than the first level of robot autonomy. The third level of robot autonomy may comprise full robot autonomy, and operation of the robot in the third control mode may require no input from the operator of the tele-operation system.

The plurality of control modes may further include a third control mode that corresponds to a third level of robot autonomy, the third level of robot autonomy being less autonomous than the second level of robot autonomy, and the computer program product when executed may further cause the robot to: identify another fault condition of the robot during operation of the robot in the second control mode; in response to identifying the another fault condition during operation of the robot in the second control mode, change the control mode from the second control mode to the third control mode; and operate the robot in the third control mode.

The at least one non-transitory processor-readable storage medium may store the plurality of control modes; the processor-executable instructions or data of the computer program product which cause the robot to operate in the first control mode may cause the robot to: access, by the at least one processor, the first control mode from the at least one non-transitory processor-readable storage medium; and operate, by the at least one processor, the robot in the first control mode; and the processor-executable instructions or data of the computer program product which cause the robot to operate in the second control mode may cause the robot to: access, by the at least one processor, the second control mode from the at least one non-transitory processor-readable storage medium; and operate, by the at least one processor, the robot in the second control mode.

The robot may include at least one sensor; the computer program product when executed may further cause the robot to capture, by the at least one sensor, sensor data representing an environment of the robot; and the processor-executable instructions or data of the computer program product which cause the robot to identify a fault condition of the robot may cause the robot to: identify, by the at least one processor based on the sensor data, that the robot has failed to complete an action to be performed by the robot.

The robot may include at least one sensor; the computer program product when executed may further cause the robot to capture, by the at least one sensor, sensor data representing an environment of the robot; and the processor-executable instructions or data of the computer program product which cause the robot to identify a fault condition of the robot may cause the robot to: identify, by the at least one processor based on the sensor data, that the robot is unable to complete an action to be performed by the robot.

The robot may include at least one sensor; the computer program product when executed may further cause the robot to capture, by the at least one sensor, sensor data representing an environment of the robot; and the processor-executable instructions or data of the computer program product which cause the robot to identify a fault condition of the robot may cause the robot to: identify, by the at least one processor based on the sensor data, that the robot has improperly completed an action to be performed by the robot.

The processor-executable instructions or data of the computer program product which cause the robot to identify a fault condition of the robot may cause the robot to: identify, by the at least one processor, that the at least one processor is unable to determine an action or movement to be performed by the robot.

The processor-executable instructions or data of the computer program product which cause the at least one processor to identify a fault condition of the robot may cause the robot to: identify, by the at least one processor, that the at least one processor is unable to determine an action or movement to be performed by the robot with sufficient confidence to perform the determined action or movement.

The processor-executable instructions or data of the computer program product which cause the at least one processor to identify a fault condition of the robot may cause the robot to: identify, by the at least one processor, that the robot has received operator input from the operator of the tele-operation system which indicates a fault condition of the robot.

The computer program product when executed may further cause the robot to: in response to identifying the fault condition of the robot during operation of the robot in the first mode, output a fault indication. The processor-executable instructions or data of the computer program product which cause the robot to output the fault indication may cause the robot to: send, by the communication interface, the fault indication to be received by the tele-operation system. The processor-executable instructions or data of the computer program product which cause the robot to output the fault indication may cause the robot to: output, by an audio output device of the robot, the fault indication.

The computer program product when executed may further cause the robot to: train the first control mode based on at least input from the operator of the tele-operation system received for operating the robot in the second control mode.

According to yet another broad aspect, the present disclosure describes a method of operating a tele-operation system, the tele-operation system comprising at least one processor, an operator input interface which receives input from an operator of the tele-operation system, and a communication interface that communicatively couples the at least one processor to a robot, the robot selectively operable in a plurality of control modes including a first control mode that corresponds to a first level of robot autonomy and at least a second control mode that corresponds to a second level of robot autonomy, the second level of robot autonomy being less autonomous than the first level of robot autonomy, the method comprising: identifying a fault condition of the robot during operation of the robot in the first control mode; in response to identifying the fault condition during operation of the robot in the first control mode, processing operator input received by the operator input interface; and sending at least one instruction based on the operator input to the robot via the communication interface, to operate the robot in the second control mode, wherein instructions sent to the robot from the tele-operation system to operate the robot in the second control mode are based on more explicit input from the operator than for operation of the robot in the first control mode.

The first level of robot autonomy may comprise full robot autonomy, and no instructions may be sent from the tele-operation system to the robot for operation of the robot in the first control mode; and the second level of robot autonomy may comprise partial robot autonomy, and sending the at least one instruction based on the operator input to the robot may comprise: sending at least one action instruction to the robot, the at least one action instruction indicating at least one action to be performed by the robot as received by the operator input interface from the operator of the tele-operation system. The plurality of control modes may further include a third control mode that corresponds to a third level of robot autonomy, the third level of robot autonomy being less autonomous than the second level of robot autonomy, where instructions sent to the robot from the tele-operation system to operate the robot in the third control mode may be based on more explicit input from the operator than instructions sent to the robot from the tele-operation system for operation of the robot in the second control mode. The third level of robot autonomy may comprise no robot autonomy, and instructions sent to the robot from the tele-operation system to operate the robot in the third control mode may include at least one movement instruction from the operator of the tele-operation system received by the operator input interface, the at least one movement instruction indicating at least one movement to be emulated by at least one actuatable member of the robot.

The first level of robot autonomy may comprise full robot autonomy, and no instructions may be sent from the tele-operation system to the robot for operation of the robot in the first control mode; and the second level of robot autonomy may comprise no robot autonomy, and instructions sent to the robot from the tele-operation system to operate the robot in the second control mode may include at least one movement instruction from the operator of the tele-operation system received by the operator input interface, the at least one movement instruction indicating at least one movement to be emulated by at least one actuatable member of the robot. The plurality of control modes may further include a third control mode that corresponds to a third level of robot autonomy, the third level of robot autonomy being less autonomous than the first level of robot autonomy and more autonomous than the second level of robot autonomy; instructions sent to the robot from the tele-operation system to operate the robot in the third control mode may be based on less explicit input from the operator than instructions sent to the robot from the tele-operation system for operation of the robot in the second control mode; and instructions sent to the robot from the tele-operation system to operate the robot in the third control mode may be based on more explicit input from the operator than for operation of the robot in the first control mode. The third level of robot autonomy may comprise partial robot autonomy, and instructions sent to the robot from the tele-operation system to operate the robot in the third control mode may include at least one action instruction indicating at least one action to be performed by the robot as received by the operator input interface from the operator of the tele-operation system.

The first level of robot autonomy may comprise partial robot autonomy; instructions sent to the robot from the tele-operation system to operate the robot in the first control mode may include at least one action instruction indicating at least one action to be performed by the robot as received by the operator input interface from the operator of the tele-operation system; the second level of robot autonomy may comprise no robot autonomy; and sending the at least one instruction based on the operator input to the robot may comprise: sending at least one movement instruction to the robot, the at least one movement instruction indicating at least one movement to be emulated by at least one actuatable member of the robot as received by the operator input interface from the operator of the tele-operation system. The plurality of control modes may further include a third control mode that corresponds to a third level of robot autonomy, the third level of robot autonomy being more autonomous than the first level of robot autonomy; and the third level of robot autonomy may comprise full robot autonomy, and no instructions may be sent from the tele-operation system to the robot for operation of the robot in the third control mode.

The plurality of control modes may further include a third control mode that corresponds to a third level of robot autonomy, the third level of robot autonomy being less autonomous than the second level of robot autonomy, and the method may further comprise: identifying another fault condition of the robot during operation of the robot in the second control mode; in response to identifying the another fault condition during operation of the robot in the second control mode, processing further operator input received by the operator input interface; and sending at least one further instruction based on the further operator input to the robot via the communication interface, to operate the robot in the third control mode.

Identifying a fault condition of the robot may comprise identifying, by the tele-operation system, the fault condition based on fault data received from the robot via the communication interface, the fault data indicating the fault condition of the robot. The fault data may indicate at least one fault condition of the robot selected from a group of fault conditions consisting of: the robot being unable to complete an action to be performed by the robot; the robot having improperly completed an action to be performed by the robot; at least one processor of the robot being unable to determine an action or movement to be performed by the robot; and at least one processor of the robot being unable to determine an action or movement to be performed by the robot with sufficient confidence to perform the determined action or movement.

Identifying a fault condition of the robot may comprise identifying, by the at least one processor, that the operator input interface has received operator input indicating a fault condition of the robot.

The tele-operation system may be communicatively coupled to a robot surveillance system which monitors activity of the robot; and identifying a fault condition of the robot may comprise identifying, by the at least one processor, that the operator input interface has received surveillance input from the robot surveillance system indicating a fault condition of the robot.

The method may further comprise: training the first control mode based on at least input from the operator of the tele-operation system received by the operator input interface for operating the robot in the second control mode.

According to yet another broad aspect, the present disclosure describes a tele-operation system comprising: at least one processor; an operator input interface which receives input from an operator of the tele-operation system; a communication interface that communicatively couples the at least one processor to a robot, the robot selectively operable in a plurality of control modes including a first control mode that corresponds to a first level of robot autonomy and at least a second control mode that corresponds to a second level of robot autonomy, the second level of robot autonomy being less autonomous than the first level of robot autonomy; at least one non-transitory processor-readable storage medium communicatively coupled to the at least one processor, the at least one non-transitory processor-readable storage medium storing processor-executable instructions which, when executed by the at least one processor, cause the tele-operation system to: identify a fault condition of the robot during operation of the robot in the first control mode; in response to identifying the fault condition during operation of the robot in the first control mode, process operator input received by the operator input interface; and send at least one instruction based on the operator input to the robot via the communication interface, to operate the robot in the second control mode, wherein instructions sent to the robot from the tele-operation system to operate the robot in the second control mode are based on more explicit input from the operator than for operation of the robot in the first control mode.

The first level of robot autonomy may comprise full robot autonomy, and no instructions may be sent from the tele-operation system to the robot for operation of the robot in the first control mode; and the second level of robot autonomy may comprise partial robot autonomy, and the processor-executable instructions which cause the robot to send at least one instruction based on the operator input to the robot via the communication interface may cause the robot to: send at least one action instruction to the robot, the at least one action instruction indicating at least one action to be performed by the robot as received by the operator input interface from the operator of the tele-operation system. The plurality of control modes may further include a third control mode that corresponds to a third level of robot autonomy, the third level of robot autonomy being less autonomous than the second level of robot autonomy, where instructions sent to the robot from the tele-operation system to operate the robot in the third control mode may be based on more explicit input from the operator than instructions sent to the robot from the tele-operation system for operation of the robot in the second control mode. The third level of robot autonomy may comprise no robot autonomy, and instructions sent to the robot from the tele-operation system to operate the robot in the third control mode may include at least one movement instruction from the operator of the tele-operation system received by the operator input interface, the at least one movement instruction indicating at least one movement to be emulated by at least one actuatable member of the robot.

The first level of robot autonomy may comprise full robot autonomy, and no instructions may be sent from the tele-operation system to the robot for operation of the robot in the first control mode; and the second level of robot autonomy may comprise no robot autonomy, and the processor-executable instructions which cause the tele-operation system to send at least one instruction based on the operator input to the robot via the communication interface may cause the tele-operation system to: send at least one movement instruction from the operator of the tele-operation system received by the operator input interface, the at least one movement instruction indicating at least one movement to be emulated by at least one actuatable member of the robot. The plurality of control modes may further include a third control mode that corresponds to a third level of robot autonomy, the third level of robot autonomy being less autonomous than the first level of robot autonomy and more autonomous than the second level of robot autonomy; instructions sent to the robot from the tele-operation system to operate the robot in the third control mode may be based on less explicit input from the operator than instructions sent to the robot from the tele-operation system for operation of the robot in the second control mode; and instructions sent to the robot from the tele-operation system to operate the robot in the third control mode may be based on more explicit input from the operator than for operation of the robot in the first control mode. The third level of robot autonomy may comprise partial robot autonomy, and instructions sent to the robot from the tele-operation system to operate the robot in the third control mode may include at least one action instruction indicating at least one action to be performed by the robot as received by the operator input interface from the operator of the tele-operation system.

The first level of robot autonomy may comprise partial robot autonomy; instructions sent to the robot from the tele-operation system to operate the robot in the first control mode may include at least one action instruction indicating at least one action to be performed by the robot as received by the operator input interface from the operator of the tele-operation system; the second level of robot autonomy may comprise no robot autonomy; and the processor-executable instructions which cause the robot to send at least one instruction based on the operator input to the robot via the communication interface may cause the robot to: send at least one movement instruction to the robot, the at least one movement instruction indicating at least one movement to be emulated by at least one actuatable member of the robot as received by the operator input interface from the operator of the tele-operation system. The plurality of control modes may further include a third control mode that corresponds to a third level of robot autonomy, the third level of robot autonomy being more autonomous than the first level of robot autonomy; and the third level of robot autonomy may comprise full robot autonomy, and no instructions may be sent from the tele-operation system to the robot for operation of the robot in the third control mode.

The plurality of control modes may further include a third control mode that corresponds to a third level of robot autonomy, the third level of robot autonomy being less autonomous than the second level of robot autonomy, and the processor-executable instructions may further cause the tele-operation system to: identify another fault condition of the robot during operation of the robot in the second control mode; in response to identifying the another fault condition during operation of the robot in the second control mode, process further operator input received by the operator input interface; and send at least one further instruction based on the further operator input to the robot via the communication interface, to operate the robot in the third control mode.

The processor-executable instructions which cause the tele-operation system to identify a fault condition of the robot may cause the tele-operation system to identify the fault condition based on fault data received from the robot via the communication interface, the fault data indicating the fault condition of the robot. The fault data may indicate at least one fault condition of the robot selected from a group of fault conditions consisting of: the robot being unable to complete an action to be performed by the robot; the robot having improperly completed an action to be performed by the robot; at least one processor of the robot being unable to determine an action or movement to be performed by the robot; and at least one processor of the robot being unable to determine an action or movement to be performed by the robot with sufficient confidence to perform the determined action or movement.

The processor-executable instructions which cause the tele-operation system to identify a fault condition of the robot may cause the at least one processor to identify that the operator input interface has received operator input indicating a fault condition of the robot.

The tele-operation system may be communicatively couplable to a robot surveillance system which monitors activity of the robot; and the processor-executable instructions which cause the tele-operation system to identify a fault condition of the robot may cause the at least one processor to identify that the tele-operation system has received surveillance input from the robot surveillance system indicating a fault condition of the robot.

The processor-executable instructions may further cause the tele-operation system to: train the first control mode based on at least input from the operator of the tele-operation system received by the operator input interface for operating the robot in the second control mode.

The operator input interface may comprise an action input interface where the operator selects an action to be performed by the robot. The operator input interface may comprise a graphical user interface or a point-and-click interface.

The operator input interface may comprise a plurality of sensors wearable by the operator, the plurality of sensors configured to capture movement by the operator as at least one movement instruction, for emulation of the movement by the robot.

According to yet another broad aspect, the present disclosure describes a computer program product comprising processor-executable instructions or data that, when the computer program product is stored in a non-transitory processor-readable storage medium of a tele-operation system, and the computer program product is executed by at least one processor of the tele-operation system, the at least one processor communicatively coupled to the non-transitory processor-readable storage medium, causes the tele-operation system to: identify a fault condition of a robot, the robot communicatively coupled to the tele-operation system by a communication interface and the robot selectively operable in a plurality of control modes including a first control mode that corresponds to a first level of robot autonomy and at least a second control mode that corresponds to a second level of robot autonomy, the second level of robot autonomy being less autonomous than the first level of robot autonomy, where the fault condition occurs during operation of the robot in the first control mode; in response to identifying the fault condition, process operator input received from an operator of the tele-operation system by an operator input interface; and send at least one instruction based on the operator input to the robot via the communication interface, to operate the robot in the second control mode, wherein instructions sent to the robot from the tele-operation system to operate the robot in the second control mode are based on more explicit input from the operator than for operation of the robot in the first control mode.

The first level of robot autonomy may comprise full robot autonomy, and no instructions may be sent from the tele-operation system to the robot for operation of the robot in the first control mode; and the second level of robot autonomy may comprise partial robot autonomy, and the processor-executable instructions or data of the computer program product which cause the robot to send at least one instruction based on the operator input to the robot via the communication interface may cause the robot to: send at least one action instruction to the robot, the at least one action instruction indicating at least one action to be performed by the robot as received by the operator input interface from the operator of the tele-operation system. The plurality of control modes may further include a third control mode that corresponds to a third level of robot autonomy, the third level of robot autonomy being less autonomous than the second level of robot autonomy, where instructions sent to the robot from the tele-operation system to operate the robot in the third control mode may be based on more explicit input from the operator than instructions sent to the robot from the tele-operation system for operation of the robot in the second control mode. The third level of robot autonomy may comprise no robot autonomy, and instructions sent to the robot from the tele-operation system to operate the robot in the third control mode may include at least one movement instruction from the operator of the tele-operation system received by the operator input interface, the at least one movement instruction indicating at least one movement to be emulated by at least one actuatable member of the robot.

The first level of robot autonomy may comprise full robot autonomy, and no instructions may be sent from the tele-operation system to the robot for operation of the robot in the first control mode; and the second level of robot autonomy may comprise no robot autonomy, and the processor-executable instructions or data of the computer program product which cause the tele-operation system to send at least one instruction based on the operator input to the robot via the communication interface may cause the tele-operation system to: send at least one movement instruction from the operator of the tele-operation system received by the operator input interface, the at least one movement instruction indicating at least one movement to be emulated by at least one actuatable member of the robot. The plurality of control modes may further include a third control mode that corresponds to a third level of robot autonomy, the third level of robot autonomy being less autonomous than the first level of robot autonomy and more autonomous than the second level of robot autonomy; instructions sent to the robot from the tele-operation system to operate the robot in the third control mode may be based on less explicit input from the operator than instructions sent to the robot from the tele-operation system for operation of the robot in the second control mode; and instructions sent to the robot from the tele-operation system to operate the robot in the third control mode may be based on more explicit input from the operator than for operation of the robot in the first control mode. The third level of robot autonomy may comprise partial robot autonomy, and instructions sent to the robot from the tele-operation system to operate the robot in the third control mode may include at least one action instruction indicating at least one action to be performed by the robot as received by the operator input interface from the operator of the tele-operation system.

The first level of robot autonomy may comprise partial robot autonomy; instructions sent to the robot from the tele-operation system to operate the robot in the first control mode may include at least one action instruction indicating at least one action to be performed by the robot as received by the operator input interface from the operator of the tele-operation system; the second level of robot autonomy may comprise no robot autonomy; and the processor-executable instructions or data of the computer program product which cause the robot to send at least one instruction based on the operator input to the robot via the communication interface may cause the robot to: send at least one movement instruction to the robot, the at least one movement instruction indicating at least one movement to be emulated by at least one actuatable member of the robot as received by the operator input interface from the operator of the tele-operation system. The plurality of control modes may further include a third control mode that corresponds to a third level of robot autonomy, the third level of robot autonomy being more autonomous than the first level of robot autonomy; and the third level of robot autonomy may comprise full robot autonomy, and no instructions may be sent from the tele-operation system to the robot for operation of the robot in the third control mode.

The plurality of control modes may further include a third control mode that corresponds to a third level of robot autonomy, the third level of robot autonomy being less autonomous than the second level of robot autonomy, and the processor-executable instructions or data of the computer program product may further cause the tele-operation system to: identify another fault condition of the robot during operation of the robot in the second control mode; in response to identifying the another fault condition during operation of the robot in the second control mode, process further operator input received by the operator input interface; and send at least one further instruction based on the further operator input to the robot via the communication interface, to operate the robot in the third control mode.

The processor-executable instructions or data of the computer program product which cause the tele-operation system to identify a fault condition of the robot may cause the tele-operation system to identify the fault condition based on fault data received from the robot via the communication interface, the fault data indicating the fault condition of the robot. The fault data may indicate at least one fault condition of the robot selected from a group of fault conditions consisting of: the robot being unable to complete an action to be performed by the robot; the robot having improperly completed an action to be performed by the robot; at least one processor of the robot being unable to determine an action or movement to be performed by the robot; and at least one processor of the robot being unable to determine an action or movement to be performed by the robot with sufficient confidence to perform the determined action or movement.

The processor-executable instructions or data of the computer program product which cause the tele-operation system to identify a fault condition of the robot may cause the at least one processor to identify that the operator input interface has received operator input indicating a fault condition of the robot.

The processor-executable instructions or data of the computer program product which cause the tele-operation system to identify a fault condition of the robot may cause the at least one processor to identify that the tele-operation system has received surveillance input indicating a fault condition of the robot from a robot surveillance system communicatively coupled to the tele-operation system, where the robot surveillance system monitors activity of the robot.

The processor-executable instructions or data of the computer program product may further cause the tele-operation system to: train the first control mode based on at least input from the operator of the tele-operation system received by the operator input interface for operating the robot in the second control mode.

The processor-executable instructions or data of the computer program product which cause the tele-operation system to process operator input received from an operator of the tele-operation system by an operator input interface may cause the tele-operation system to: process operator input received from an operator of the tele-operation system by an action input interface where the operator selects an action to be performed by the robot. The processor-executable instructions or data of the computer program product which cause the tele-operation system to process operator input received from an operator of the tele-operation system by an operator input interface may cause the tele-operation system to: process operator input received from an operator of the tele-operation system by a graphical user interface or a point-and-click interface.

The processor-executable instructions or data of the computer program product which cause the tele-operation system to process operator input received from an operator of the tele-operation system by an operator input interface may cause the tele-operation system to: process operator input received from an operator input interface comprising a plurality of sensors wearable by the operator, the plurality of sensors configured to capture movement by the operator as at least one movement instruction, for emulation of the movement by the robot.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
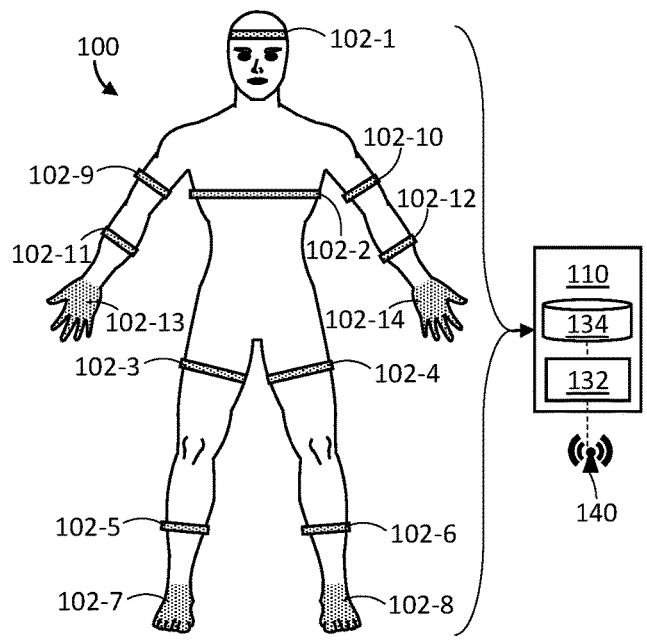
FIG. 1 is a front view of an exemplary human operator equipped with a tele-operation system, who can operate, monitor, or provide feedback or input to robots.

The following description sets forth specific details in order to illustrate and provide an understanding of the various implementations and embodiments of the present robots, tele-operation systems, methods and computer program products. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present robots, tele-operations systems, methods, and computer program products.

The various embodiments described herein provide robots, tele-operation systems, computer program products, and methods for controlling operation of said robots, tele-operation systems, and computer program products.

The discussion herein details several different control modes in which robots can be operated, in accordance with different levels of robot autonomy. Depending on a given control mode, at least one instruction provided to a robot from a tele-operation system can have a different level of "explicitness", in terms of how explicit an input from an operator of the tele-operation system is. Generally, for a control mode where a robot has a high level of robot autonomy (the robot is highly autonomous), instructions for a robot are based on less explicit input from an operator (compared to control modes where the robot has a low level of autonomy). In the reverse, for a control mode where a robot has a low level of robot autonomy (the robot is less autonomous), instructions for a robot are based on more explicit input from an operator (compared to control modes where the robot has a high level of autonomy). "Explicitness" as used herein refers to a level of abstractness of an instruction. As one example, in some cases a robot can be sent an instruction which includes a movement instruction detailing a movement pattern, where the robot is to emulate the movement pattern. Such an instruction is highly "explicit", in that how the robot is instructed to move is specified in a very detailed manner. As another example, a robot may be sent an action instruction which includes an action to be performed by the robot, but does not necessarily instruct the robot on how exactly the action is to be performed. Such an action instruction is based on less explicit input from an operator than the movement instruction described above.

In a comparative example, an operator may wish for a robot to pick up an apple. In a control mode with a low level of robot autonomy, where instructions to the robot are based on highly explicit operator input, the operator may be wearing motion sensors (such as in FIG. 1 discussed below), and may perform a gesture corresponding to picking up the apple. Instructions detailing how the robot should actuate members such as a robot arm, hand and fingers can be sent to the robot, for the robot to emulate. In a control mode with a higher level of robot autonomy (than the preceding example), an operator may input a command to pick up an apple (e.g. via a graphical user interface such as a point and click interface). In this example, the operator specifies an action to be performed, and an instruction is sent to the robot to perform the action. However, the precise movements the robot must make (e.g. how an arm member, hand member, or fingers members should move) is determined by the robot control system without further direction from the operator. Thus, instructions to the robot in the example are based on less explicit operator input than the previous example for the movement instruction.

FIG. 1 is a front view of an exemplary human operator 100, who can operate, monitor, or provide feedback or input to robots. In the example, operator 100 is equipped with motion sensors 102-1 to 102-14. The motion sensors are equipped to the operator 100 and capture motion data for specific anatomical regions, as detailed in Table 1 later.

More or fewer motion sensors could be used as appropriate for a given application. Further, although most of the sensors are illustrated as being separate bands worn by the operator, other forms of sensor could be used. Examples include adhesive sensors, or a body suit which has sensors attached or embedded therein. Further, sensors 102-7, 102-8, 102-13, and 102-14 are illustrated as boots or gloves worn on the hands or feet of operator 100, and have sensors therein which capture detailed motion data of the hands and feet. However, other sensor implementations are possible, including bands or rings worn on the fingers or toes of operator 100. Motion data from sensors 102-1 to 102-14 is received by a computing unit 110. Computing unit 110 as illustrated includes at least one processor 132, and at least one non-transitory processor-readable storage medium 134 communicatively coupled to the at least one processor 132. Further, computing unit 110 is communicatively coupled to a communication interface 140, which in turn can communicate with other robots or devices. Communication interface 140 is shown in FIG. 1 as a wireless interface, but a wired communication interface is also possible. Computing unit 110 can analyze or interpret the motion data, and provide at least one instruction to a robot based on or including the motion data. In this way, sensors 102-1 to 102-14 and computing unit 110 act as at least part of a "tele-operation device" or a "tele-operation system", by which an operator can provide input or feedback to a robot. The at least one non-transitory processor-readable storage medium 134 can store processor-executable instructions that, when executed by the at least one processor 132, can cause the tele-operation system of FIG. 1 to perform methods discussed herein (e.g. method 1000 in FIG. 10).

Figure 2:
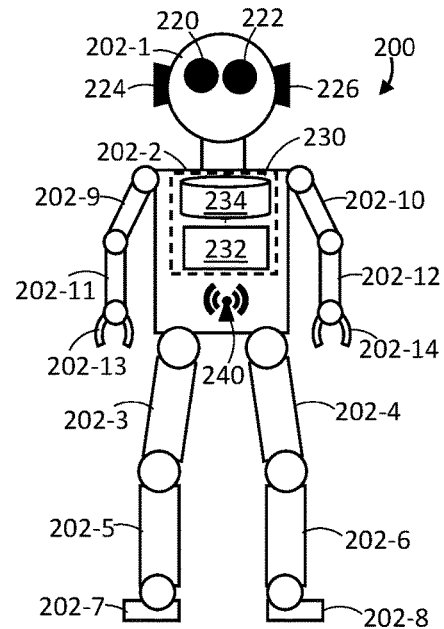
FIG. 2 is a front view of an exemplary robot which approximates human anatomy in accordance with one exemplary implementation.

FIG. 2 is a front view of an exemplary robot 200 in accordance with one implementation. In the illustrated example, robot 200 is designed to approximate human anatomy, including a number of actuatable components 202-1 to 202-14 which approximate anatomical features. More or fewer anatomical features could be included as appropriate for a given application. Further, how closely a robot approximates human anatomy can also be selected as appropriate for a given application. The tele-operation system of FIG. 1 can be used to operate, control, or provide input or feedback to the robot 200. In this example, data from each of the motion sensors 102-1 to 102-14 can be used to drive or provide instructions for causing actuation of a corresponding actuatable component of robot 200. Table 1 below details the anatomy to which each sensor 102-1 to 102-14 in FIG. 1 is equipped, as well as the actuatable components in FIG. 2 which correspond to said anatomy.

TABLE 1

| Anatomy | FIG. 1 Sensor | FIG. 2 Actuatable Component |
| --- | --- | --- |
| Head | 102-1 | 202-1 |
| Torso | 102-2 | 202-2 |
| Right Thigh | 102-3 | 202-3 |
| Left Thigh | 102-4 | 202-4 |
| Right Calf | 102-5 | 202-5 |
| Left Calf | 102-6 | 202-6 |
| Right Foot | 102-7 | 202-7 |
| Left Foot | 102-8 | 202-8 |
| Right Bicep | 102-9 | 202-9 |
| Left Bicep | 102-10 | 202-10 |
| Right Forearm | 102-11 | 202-11 |
| Left Forearm | 102-12 | 202-12 |
| Right Hand | 102-13 | 202-13 |
| Left Hand | 102-14 | 202-14 |

Actuators, motors, or other movement devices can couple together actuatable components. Driving said actuators, motors, or other movement devices causes actuation of the actuatable components. For example, rigid limbs in a humanoid robot can be coupled by motorized joints, where actuation of the rigid limbs is achieved by driving movement in the motorized joints.

Robot 200 in FIG. 2 very closely approximates human anatomy, such that input to or control of robot 200 can be provided by the operator 100 performing at least one movement or motion with the tele-operation system of FIG. 1, to be emulated by the robot. That is, in this example robot 200 can be sent an instruction which includes a movement instruction detailing a movement pattern based on data captured by motion sensors 102-1 to 102-14 in FIG. 1, where the robot is to emulate the movement pattern. Such an instruction is highly "explicit", in that how the robot is instructed to move is specified in a very detailed manner. This form of operation can be referred to as "low-level tele-operation" or "LLT". Alternatively, this form of operation can also be referred to as "analogous tele-operation".

Robot 200 is also illustrated as including sensors 220, 222, 224, and 226, which collect context data representing an environment of robot 200. In the example, sensors 220 and 222 are image sensors (e.g. cameras) that capture visual data representing an environment of robot 200. Although two image sensors 220 and 222 are illustrated, more or fewer image sensors could be included. Also in the example, sensors 224 and 226 are audio sensors (e.g. microphones) that capture audio data representing an environment of robot 200. Although two audio sensors 224 and 226 are illustrated, more or fewer audio sensors could be included. Two types of sensors are illustrated in the example of FIG. 2, though more or fewer sensor types could be included. For example, only one of image sensors or audio sensors could be included. As another example, other sensor types, such as tactile sensors, accelerometers, inertial sensors, gyroscopes, temperature sensors, humidity sensors, pressure sensor, radiation sensors, or any other appropriate types of sensors could be included. Further, although sensors 220 and 222 are shown as approximating human eyes, and sensors 224 and 226 are shown as approximating human ears, sensors 220, 222, 224, and 226 could be positioned in any appropriate locations and have any appropriate shape.

Robot 200 is also illustrated as including at least one processor 232, communicatively coupled to at least one non-transitory processor-readable storage medium 234. The at least one processor 232 can control actuation of components 202-1 to 202-14; can receive and process data from sensors 220, 222, 224, and 226; and can determine context of the robot 200 (for example to identify a fault condition as discussed later with reference to FIG. 9). The at least one non-transitory processor-readable storage medium 234 can have processor-executable instructions stored thereon, which when executed by the at least one processor 232 can cause robot 200 to perform any appropriate method discussed herein (e.g. method 900 in FIG. 9). Further, the at least one non-transitory processor-readable storage medium 234 can store sensor data, classifiers, or any other data as appropriate for a given application. The at least one processor 232 and the at least one processor-readable storage medium 234 together can be considered as components of a "robot controller" 230, in that they control operation of robot 200 in some capacity. While the at least one processor 232 and the at least one processor-readable storage medium 234 can perform all of the respective functions described in this paragraph, this is not necessarily the case, and the "robot controller" 230 can be or further include components that are remote from robot 200. In particular, certain functions can be performed by at least one processor or at least one non-transitory processor-readable storage medium remote from robot 200.

Robot 200 is also illustrated as including a communication interface 240. Communication interface 240 is shown in FIG. 2 as a wireless interface, but a wired communication interface is also possible. Communication interface 240 can be used for communication with at least one device remote from robot 200, such as an operator input interface as in FIG. 1, or as discussed below with reference to FIGS. 5, 6, 7, and 8.

Figure 3:
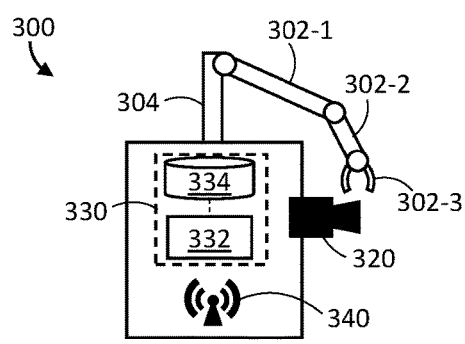
FIG. 3 is an elevated side view of a robot which approximates only a portion of human anatomy in accordance with one exemplary implementation.

In some implementations, it is possible to even more closely approximate human anatomy than illustrated in FIG. 2, such as by inclusion of actuatable components in a face on the head 202-1 of robot 200, or with more detailed design of hands 202-13 and 202-14 of robot 200, as non-limiting examples. However, in other implementations a complete approximation of the human anatomy is not required. FIG. 3 is an elevated side view of a robot 300, which approximates only a portion of human anatomy. In particular, robot 300 includes a base or stand 304, having actuatable components 302-1, 302-2, and 302-3 coupled thereto. In the example, actuatable components 302-1 to 302-3 approximate an arm of a human. To provide input to robot 300, operator 100 could rely on the motion sensors worn on either arm. For example, motion data from sensors 102-9, 102-11, and 102-13 could be used to drive motion of actuatable components 302-1, 302-2, and 302-3, respectively. Alternatively, motion data from sensors 102-10, 102-12, and 102-14 could be used to drive motion of actuatable components 302-1, 302-2, and 302-3, respectively. When providing input to robot 300, operator 100 does not need to wear all of the motion sensors illustrated in FIG. 1. FIG. 3 illustrates a robot which approximates only an arm of human anatomy; this is merely an illustrative example, and other portions of human anatomy could be approximated instead. As non-limiting examples, only a head or face could be approximated; or only a leg could be approximated.

Robot 300 is also illustrated as including sensor 320, which is illustrated as an image sensor. The description pertaining to sensors 220, 222, 224, and 226 in FIG. 2 is also applicable to sensor 320 in FIG. 3 (and is applicable to inclusion of sensors in robot bodies in general).

Robot 300 is also illustrated as including a local or on-board robot controller 330 comprising at least one processor 332 communicatively coupled to at least one non-transitory processor-readable storage medium 334. The at least one processor 332 can control actuation of components 302-1, 302-2, and 302-3; can receive and process data from sensor 320; and can determine context of the robot 300 similarly to as discussed above with reference to robot 200 in FIG. 2. The at least one non-transitory processor-readable storage medium 334 can store processor-executable instructions that, when executed by the at least one processor 332, can cause robot 300 to perform methods discussed herein (e.g. method 900 in FIG. 9). Further, the at least one processor-readable storage medium 334 can store sensor data, classifiers, or any other data as appropriate for a given application.

Robot 300 is also illustrated as including a communication interface 340. Communication interface 340 is shown in FIG. 3 as a wireless interface, but a wired communication interface is also possible. Communication interface 340 can be used for communication with at least one device remote from robot 300, such as an operator input interface as in FIG. 1, or as discussed below with reference to FIGS. 5, 6, 7, and 8.

Figure 4:
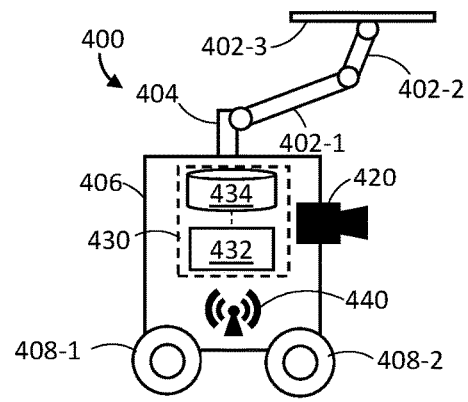
FIG. 4 is an elevated side view of a robot which does not approximate human anatomy, in accordance with one exemplary implementation.

FIGS. 2 and 3 illustrate robots which at least partially approximate human anatomy. However, this is not necessarily the case. FIG. 4 is an elevated side view of a robot 400 which does not approximate human anatomy. Robot 400 includes a body 406, having actuatable components 402-1, 402-2, and 402-3 coupled thereto via a stand 404. Body 406 has wheels 408-1 and 408-2 coupled thereto, which provide movement capabilities to the robot. Wheels 408-1 and 408-2 do not approximate human anatomy, but input can still be provided by an operator to drive movement of the robot 400, by abstracting the nature of the input. For example, operator 100 could walk forward, and the at least one processor 132 could process captured motion data to provide instructions to robot 400 to drive forward. Similar abstraction can occur for other movements of the robot, including turning or actuation of actuatable components 402-1, 402-2, and 402-3.

Robot 400 is also illustrated as including sensor 420, which is illustrated as an image sensor. The description pertaining to sensors 220, 222, 224, and 226 in FIG. 2 is also applicable to sensor 420 in FIG. 4 (and is applicable to inclusion of sensors in robot bodies in general).

Robot 400 is also illustrated as including a local or on-board robot controller 430 comprising at least one processor 432 communicatively coupled to at least one non-transitory processor-readable storage medium 434. The at least one processor 432 can control actuation of components 402-1, 402-2, and 402-3; can receive and process data from sensor 420; and can determine context of the robot 400 similarly to as discussed above with reference to robot 200 in FIG. 2. The at least one non-transitory processor-readable storage medium 434 can store processor-executable instructions that, when executed by the at least one processor 432, can cause robot 400 to perform methods discussed herein (e.g. method 900 in FIG. 9). Further, the at least one processor-readable storage medium 434 can store sensor data, classifiers, or any other data as appropriate for a given application.

Robot 400 is also illustrated as including a communication interface 440. Communication interface 440 is shown in FIG. 4 as a wireless interface, but a wired communication interface is also possible. Communication interface 440 can be used for communication with at least one device remote from robot 400, such as an operator input interface as in FIG. 1, or as discussed below with reference to FIGS. 5, 6, 7, and 8.

Abstraction of input may be useful for any/all forms of tele-operation system and robot. For example, even in the case of robot 200 which closely approximates human anatomy, abstraction of input is useful for providing a less explicit means of providing input or feedback. Exemplary forms of abstracted input are discussed below with reference to FIGS. 5 and 6.

Figure 5:
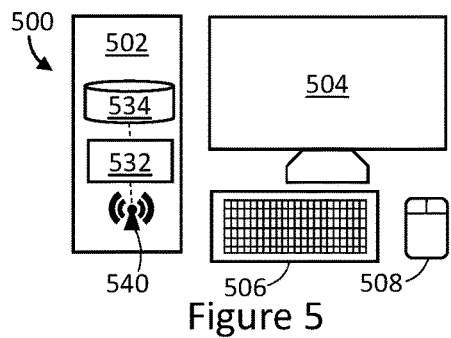
FIG. 5 is a schematic view of a computing unit which can be used to provide instructions to a robot in accordance with one exemplary implementation.

FIG. 5 is a schematic view of a tele-operation system 500, including a computing unit 502, with a display 504, a keyboard 506, and a mouse 508 communicatively coupled thereto. Tele-operation system 500 can act as a tele-operation system for controlling, operating, or otherwise influencing or monitoring actions of at least one robot. Computing unit 502 as illustrated includes at least one processor 532, and at least one non-transitory processor-readable storage medium 534 communicatively coupled to the at least one processor 532. Further, computing unit 502 is communicatively coupled to a communication interface 540, which in turn can communicate with other robots or devices.

Communication interface 540 is shown in FIG. 5 as a wireless interface, but a wired communication interface is also possible. An operator of tele-operation system 500 can provide operator input by keyboard 506 or mouse 508 (examples of operator input interfaces), which can be interpreted or processed by the at least one processor 532, and act as or be the basis for instructions provided to a robot by the tele-operation system 500. For example, an operator could select at least one action displayed on display 504 using keyboard 506 or mouse 508. As another example, a video feed from a camera of a robot could be displayed on display 504, and an operator could control movement of the robot using keyboard 506 and/or mouse 508. The specific components illustrated in FIG. 5 are exemplary, and could be removed, substituted, or supplemented as appropriate for a given application. For example, tele-operation system 500 could comprise an integrated laptop. As another example, display 504 could be omitted, and an operator could control a robot by looking at the robot directly. As another example, keyboard 506 and mouse 508 could be replaced or supplemented by other input devices, such as a microphone, trackpad, joystick, touchscreen, or any other appropriate input device. The at least one non-transitory processor-readable storage medium 534 can store processor-executable instructions that, when executed by the at least one processor 532, can cause the tele-operation system of FIG. 5 to perform methods discussed herein (e.g. method 1000 in FIG. 10).

Figure 6:
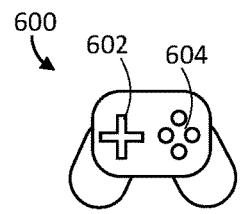
FIG. 6 is a front view of an input controller which can be used to provide instructions to a robot in accordance with one exemplary implementation.

FIG. 6 is a front view of an input controller 600 (an exemplary operator input interface), which includes directional input buttons 602, and other input buttons 604. The exact buttons included could be determined as appropriate for a given application. In an example use case, an operator can provide input to input controller 600, which are sent to as or act as the basis of at least one instruction provided to a robot (e.g. could be interpreted or processed by at least one processor, such as the at least one processor 532). For example, a robot could be made to move in specific directions by pressing appropriate directional input buttons 602. Other actions, such as opening or closing a gripper, moving an arm, or any other appropriate actions, could be performed by pressing buttons 604.

FIGS. 5 and 6 are merely illustrative examples of certain forms of tele-operation systems and operator input interfaces, which can receive abstracted input. Other forms of abstracted input could by implemented and used as appropriate for a given application.

Instructions for a robot which are based on input from an operator via abstract operator input interfaces such as tele-operation system 500 or input controller 600 are generally less "explicit" compared to instructions based on operator input provided by low-level tele-operation "LLT" as discussed above with reference to FIGS. 1 and 2. In particular, based on operator input which is input via abstract operator input interfaces such as tele-operation system 500 or input controller 600, a robot may be sent an action instruction which includes an action to be performed by the robot, but does not necessarily instruct the robot on how exactly the action is to be performed. For example, an action instruction could instruct the robot a direction or path to move, but such an instruction does not detail how the robot should actuate respective actuatable members to accomplish the movement. Thus, some decision making regarding how to move is up to the robot (or an AI or control paradigm according to which the robot takes action and makes decisions). In this sense, a robot controlled via abstract operator input interfaces such as tele-operation system 500 or input controller 600 operates with a higher level of robot autonomy than a robot which is provided detailed movement instructions by a low-level tele-operation interface as discussed above. Controlling or influencing a robot via abstract operator input interfaces such as tele-operation system 500 or input controller 600 can be referred to as "high-level tele-operation" or "HLT".

Compared to LLT, HLT advantageously is less onerous on an operator, because an operator can input an action or objective without needing to guide the robot through detailed aspects of the action or objective. Further, an operator input interface used for HLT can be more portable or easier to initialize than an operator input interface used for LLT. For example, the LLT operator input interface of FIG. 1 uses a plurality of sensors equipped to the operator 100, which can be time consuming and cumbersome to equip. On the other hand, input controller 600 can be held in an operator's hand, and easily picked up or put down as needed. Furthermore, HLT enables a single operator to control a fleet of robots simultaneously.

Compared to HLT, LLT is advantageous for providing explicit or detailed operator input, which can be useful for navigating a robot through a difficult or new scenario, and can be useful for instructing or training a robot, where HLT is insufficient (or insufficiently trained) to handle a scenario or action.

In addition to LLT and HLT, a robot can also be operated in a "fully autonomous" control mode (FA). Generally, full autonomy entails that a robot can act on its own within a scope of the robot (e.g. based on analysis and processing performed by at least one processor of the robot). For example, a bathroom-cleaning robot operating in FA (or at least one processor thereof) can decide what actions or steps to take in order to access a bathroom, access necessary tools, and clean the bathroom. As another example, a vehicle-operator robot operating in FA (or at least one processor thereof) can decide how to travel along a route to a destination, and control a vehicle in order to traverse the route. In some cases, full autonomy of a robot can include the robot being able to shift or expand its own scope. In the above example of the bathroom-cleaning robot, the bathroom-cleaning robot may be able to identify when bathroom cleaning is complete, and navigate to another bathroom for cleaning, or to determine another task (e.g. cleaning a non-bathroom space), and to proceed accordingly. In the above example of the vehicle-operator robot, the vehicle-operator robot may be able to, after arriving at the destination, determine a next destination (e.g. for a passenger transport vehicle, a location of a new passenger for pickup), and proceed to the next destination. In some cases, a human operator may provide instructions to the robot for the robot to shift scope or proceed to another task. Generally, when operating in an FA control mode, a robot should not require input from an operator to operate within its scope. However, such a robot can still be open to operator input or instructions. For example, an operator could interrupt a robot during a task to instruct the robot to change tasks or shift scope. As another example, an operator could provide input such as affirmation or disapproval of at least one action or decision taken by the robot, which can be used to train an AI or control paradigm of the robot.

Compared to HLT and LLT, FA advantageously is the least onerous on human operators. However, FA may result in the robot being unable to perform actions, or performing inappropriate or insufficient actions.

In view of the above, there are cases when FA is appropriate for operation of a robot, there are cases when HLT is appropriate for operation of a robot, and there are cases where LLT is appropriate for operation of a robot. The present disclosure details robots, tele-operation systems, methods, and computer program products for selectively operating robots in certain control modes, to utilize the different advantages offered by different control modes available to a robot as appropriate.

Figure 7:
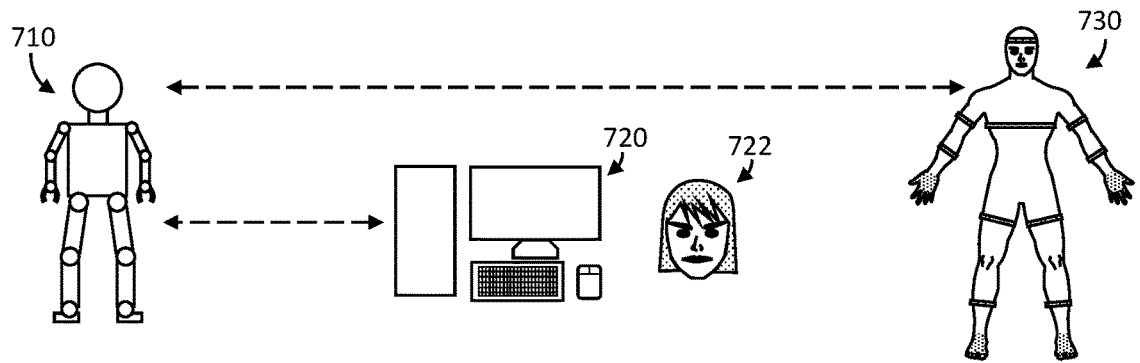
FIG. 7 is a schematic diagram illustrating a robot and tele-operation systems, in accordance with one exemplary implementation.

FIG. 7 is a schematic diagram which illustrates an exemplary robot 710 which is selectively operable in a plurality of control modes. Robot 710 could be any robot as appropriate for a given application, such as robot 200 in FIG. 2, robot 300 in FIG. 3, or robot 400 in FIG. 4, as non-limiting examples. The plurality of control modes could include any of a fully autonomous (FA) control mode, a high-level tele-operation (HLT) control mode, and low-level tele-operation (LLT) control mode, or any other appropriate mode. The plurality of control modes is not required to include each of an FA control mode, an HLT control mode, and an LLT control mode. For example, it may be difficult to implement an LLT control mode for a robot such as robot 400 in FIG. 4, based on a tele-operation system such as that illustrated in FIG. 1, because robot 400 does not approximate human anatomy. Further, implementation of three control modes may not be required (two control mode may be sufficient for a given application). Further, although the present disclosure discusses FA control modes, HLT control modes, and LLT control modes in detail, the discussion also applies to other control modes which are defined differently from the control modes discussed herein.

In the example of FIG. 7, robot 710 can operate in an FA control mode, based on processing performed locally by at least one processor of robot 710, or through communication with a remote device which stores and implements at least part of an AI or control paradigm of robot 710. That is, some processing, data storage, algorithm storage, or similar can be remote from robot 710, but still accessed and utilized remotely by robot 710 (e.g. fully autonomous operation of robot 710 can be distributed across a plurality of devices which extends beyond just the robot 710 itself). In some implementations, fully autonomous operation of robot 710 can occur exclusively at robot 710 (i.e. locally).

Further still in the example of FIG. 7, robot 710 can operate in an HLT control mode. FIG. 7 illustrates an exemplary tele-operation system 720, which includes an operator input interface which receives input from an operator 722 and provides at least one instruction to robot 710 based on the received input. Tele-operation system 720 could for example include tele-operation system 500 in FIG. 5, input controller 600 in FIG. 6, or any other appropriate tele-operation system.

Further still in the example of FIG. 7, robot 710 can operate in an LLT control mode. FIG. 7 illustrates an exemplary tele-operation system 730, which includes a tele-operation system such as that described with reference to FIG. 1, which receives input from an operator equipped with the operator input interface, and provides at least one instruction to robot 710 based on the received input.

In addition to robot 710 receiving at least one instruction from tele-operation system 720 or tele-operation system 730 when in the HLT control mode or LLT control mode, robot 710 can also provide data to tele-operation system 720 or tele-operation system 730. As non-limiting examples, the data could include sensor data from at least one sensor of robot 710, query data from robot 710 which indicates a request by the robot to a tele-operation system or operator, log data which indicates decisions or actions of the robot, or any other appropriate data.

Figure 8:
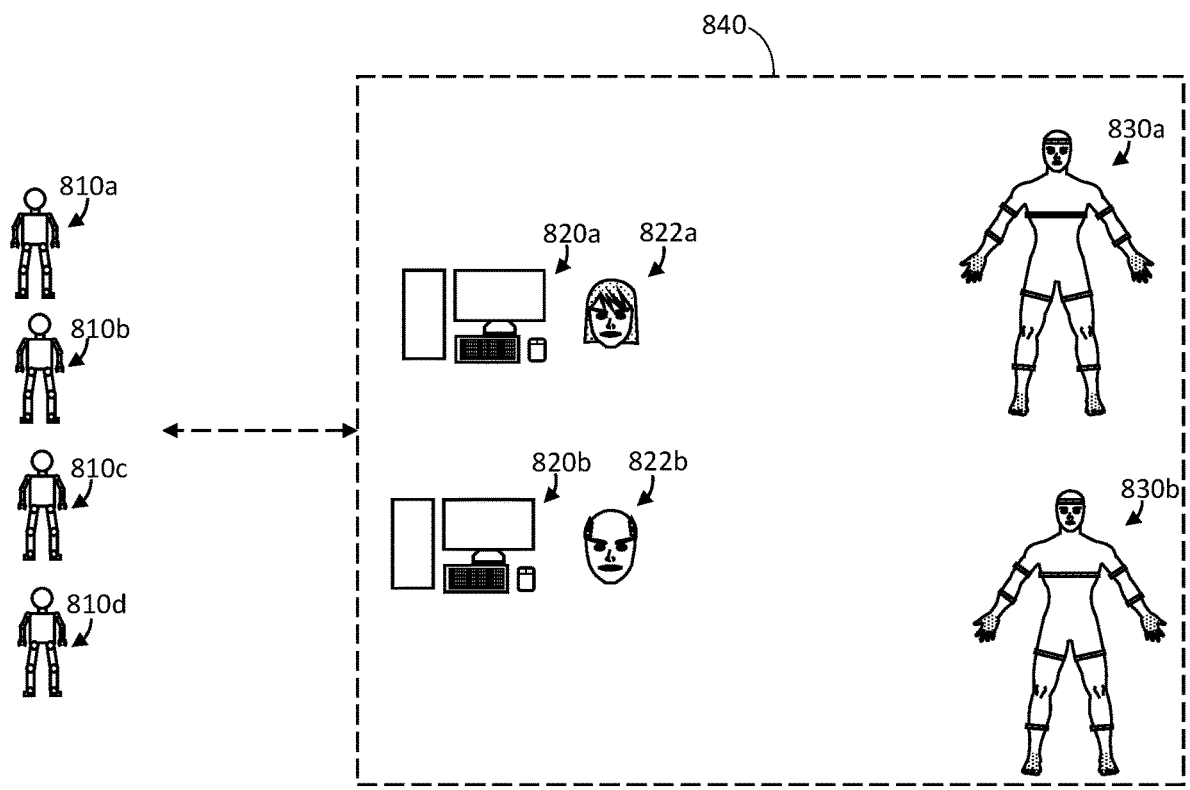
FIG. 8 is a schematic diagram illustrating a plurality of robots and tele-operation systems, in accordance with one exemplary implementation.

FIG. 7 illustrates one robot 710, one tele-operation system 720 for an HLT control mode, and one tele-operation system 730 for an LLT control mode. However, any number of robots or tele-operation systems could be implemented as appropriate for a given application. FIG. 8 is a schematic diagram which illustrates a plurality of robots 810a, 810b, 810c, and 810d (collectively referred to as robots 810), which can each be similar to robot 710. Description of robot 710 is applicable to each of robots 810 unless context dictates otherwise. Although four robots are illustrated, any appropriate number of robots could be included. FIG. 8 also illustrates a plurality of tele-operation systems 820a and 820b (collectively referred to as tele-operation systems 820), operated by respective operators 822a and 822b, for operation of respective robots in an HLT control mode. Tele-operation systems 820 are similar to tele-operation system 720, and description of tele-operation system 720 is applicable to each of tele-operation systems 820 unless context dictates otherwise. Although two such tele-operation systems are illustrated, any appropriate number of tele-operation systems could be included. FIG. 8 also illustrates a plurality of tele-operation systems 830a and 830b (collectively referred to as tele-operation systems 830), operated by respective operators, for operation of respective robots in an LLT control mode. Tele-operation systems 830 are similar to tele-operation system 730, and description of tele-operation system 730 is applicable to each of tele-operation systems 830 unless context dictates otherwise. Although two such tele-operation systems are illustrated, any appropriate number of tele-operation systems could be included. In the system of FIG. 8, generally each of robots 810 operates in an FA control mode. However, any of robots 810 could be operated in an HLT control mode or an LLT control mode as appropriate (as discussed later with reference to FIGS. 9 and 10). When operation in an HLT control mode is appropriate, a given one of robots 810 connects to an available one of tele-operation systems 820, and the one tele-operation system provides at least one instruction to the one robot for operation in the HLT control mode. Similarly, when operation in an LLT control mode is appropriate, a given one of robots 810 connects to an available one of tele-operation systems 830, and the one tele-operation system provides at least one instruction to the one robot for operation in the LLT control mode. It is preferable if any of robots 810 can connect to any of tele-operation systems 820 or tele-operation systems 830. In this way, a larger number of robots 810 can operate fully autonomously, and can be supported by a smaller number of tele-operation systems which provide support for HLT or LLT control modes, as needed.

In some implementations, a tele-operation system can include a plurality of tele-operation subsystems. In FIG. 8, a tele-operation system 840 is illustrated, which includes each of tele-operation systems 820 and each of tele-operation systems 830. In such an implementation, tele-operation systems 820 and 830 can be referred to as tele-operation subsystems. Tele-operation system 840 can include at least one processor, at least one non-transitory processor-readable storage medium communicatively coupled to the at least one processor, and a communication interface. Any of robots 810 can communicate with tele-operation system 840 via the communication interface (for example to communicate a fault condition), and the at least one processor of tele-operation system 840 can identify an appropriate tele-operation subsystem to interact with said robot. For example, the at least one processor of tele-operation system 840 could identify a tele-operation subsystem which is available for communication with a robot (i.e. not occupied with operating another robot), or what control mode is appropriate (e.g. whether the robot should be connected with an HLT-based tele-operation subsystem like tele-operation sub-systems 820, or whether the robot should be connected with an LLT-based tele-operation subsystem like tele-operation sub-systems 830).

To develop a robot which can be operated by abstracted input, according to one implementation, the robot could first be operated using non-abstracted input, and gradually trained to be operated based on abstracted input. For example, with reference to FIG. 7, robot 710 (or any other appropriate robot) can be operated explicitly in an LLT control mode using the tele-operation system 730, with an operator performing movement as input, to provide a movement instruction to robot 710 for emulation by robot 710. Over time, an AI or control paradigm by which robot 710 is operated is trained to learn movements, motions, or actions. For example, an AI or control paradigm for robot 710 could learn to walk and balance by emulating walking motion of an operator using tele-operation system 730. At this stage, abstracted forms of input can be used (e.g. operating robot 710 in an HLT control mode). Subsequently, an operator could provide input via tele-operation system 720 instructing the robot 710 to move between different locations, and the robot can utilize the trained walking and balancing in order to perform the movement. Further, a FA control mode of the robot 710 can be trained based on operation of the robot 710 in the HLT mode. In particular, an AI or control paradigm of robot 710 can be trained based on what actions or instructions are provided to the robot 710 by tele-operation system 720, to learn what actions are appropriate in particular environmental contexts of the robot 710. Once trained, the robot 710 can operate in an FA mode, where an AI or control paradigm of robot 710 makes determinations or decisions as to what actions to perform.

The above training and learning process is not always perfect, and even a highly trained AI or control paradigm may sometimes take inappropriate, improper, or insufficient actions, or may not be able to decide on an action to perform. To address this, a control mode of the robot 710 may be changed as needed in order to provide human operator guidance, feedback, or instructions as needed for the robot to perform optimally, and to further train an AI or control paradigm of the robot.

Figure 9:
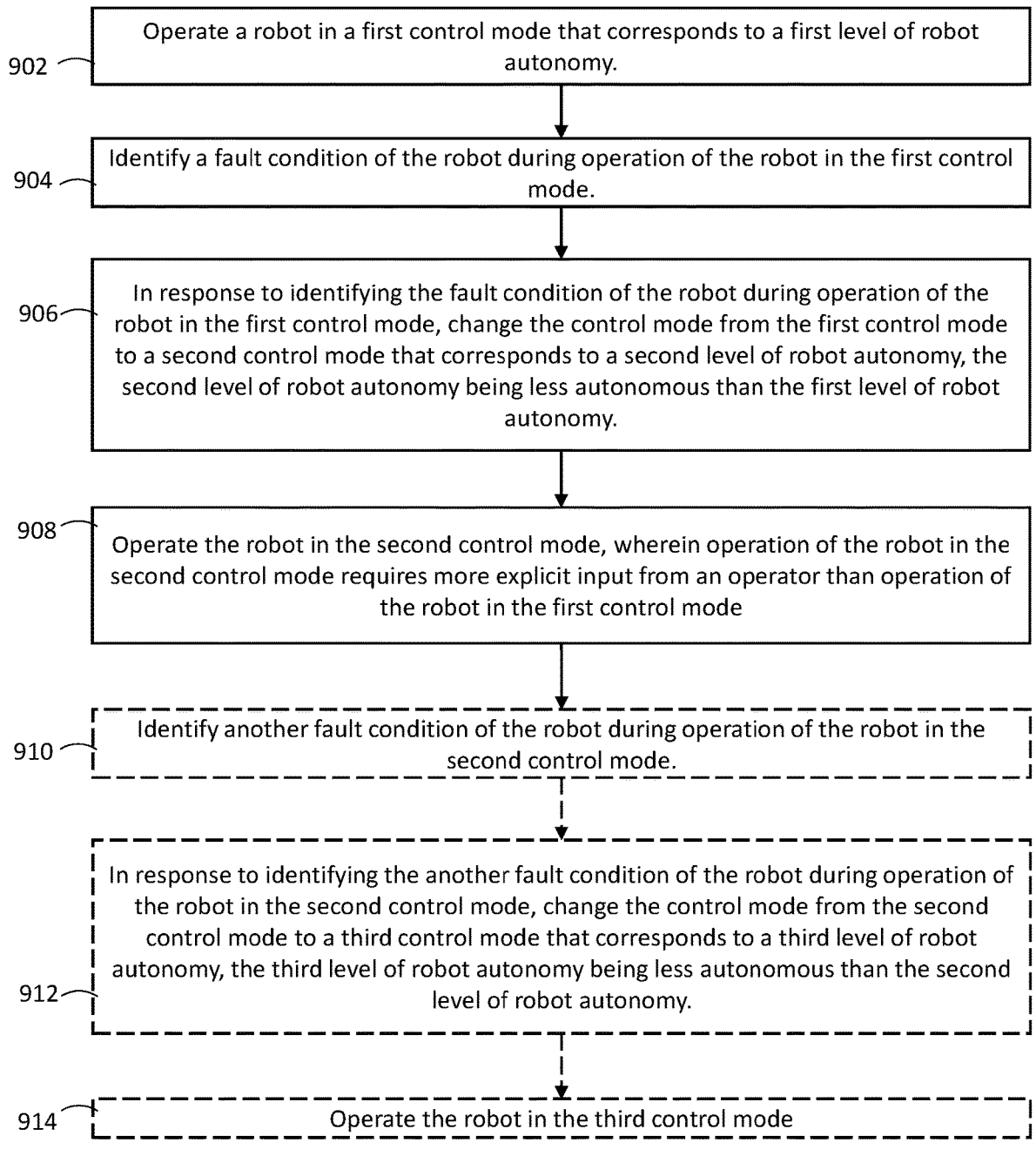
FIG. 9 is a flowchart diagram which illustrates a method for operating a robot.

FIG. 9 is a flowchart diagram showing an exemplary method 900 of operating a robot in accordance with the present disclosure. Method 900 as illustrated includes acts 902, 904, 906, 908, 910, 912, and 914, though those of skill in the art will appreciate that in alternative implementations certain acts may be omitted and/or additional acts may be added. Acts 910, 912, and 914 in particular are shown in dashed lines to highlight that these acts are optional. Those of skill in the art will also appreciate that the illustrated order of the acts is shown for exemplary purposes only and may change in alternative implementations.

The acts of method 900 are described from the perspective of a robot 200 in FIG. 2, though other robots with similar hardware could be used instead (such as robot 300 in FIG. 3, robot 400 in FIG. 4, robot 710 in FIG. 7, or any of robots 810 in FIG. 8). As such, references to components of robot 200 also apply to similar components of other robots when utilized instead of robot 200. The robot 200 comprises at least one processor 232 and a communication interface 240 that communicatively couples the at least one processor 232 to a tele-operation system (such as any of the tele-operation system in FIG. 1, tele-operation system 500 in FIG. 5, input controller 600 in FIG. 6, tele-operation systems 720 or 730 in FIG. 7, or tele-operation systems 820 or 830 in FIG. 8, or any other appropriate tele-operation system). Further, robot 200 can comprise a non-transitory processor-readable storage medium 234 communicatively coupled to the at least one processor 232. The at least one processor-readable storage medium 234 can store processor-executable instructions which, when executed by the at least one processor 232, cause the robot 200 to perform method 900. In some implementations, the acts of method 900 can be comprised in a computer program product stored on a non-transitory processor-readable storage medium (e.g. non transitory processor-readable storage medium 234). The computer program product comprises processor-executable instructions or data that, when the computer program product is executed by at least one processor of the robot (e.g. processor 232), the robot is caused to perform the acts of method 900.

The robot 200 as operated in accordance with method 900 is selectively operable between a plurality of control modes that include a first control mode that corresponds to a first level of robot autonomy, and at least a second control mode that corresponds to a second level of robot autonomy, the second level of robot autonomy being less autonomous than the first level of robot autonomy. The plurality of control modes could include additional control modes (e.g. a third control mode), as is discussed later. Control modes of the plurality of the control modes could correspond to an FA control mode, an HLT control mode, or an LLT control mode, as appropriate for a given application. Alternatively, control modes of the plurality of control modes could correspond to other defined control modes, as appropriate for a given application. Generally, operation of the robot in the second control mode requires more explicit input from an operator of the tele-operation system via the communication interface than operation of the robot in the first control mode.

At 902, robot 200 is operated in the first control mode. This operation can comprise the at least one processor 232 controlling decision making and action taking of robot 200. For example, at least one non-transitory processor-readable storage medium accessible to the at least one processor 232 can store the plurality of control modes. This at least one non-transitory processor-readable storage medium could for example be local to the robot 200 (e.g. the at least one non-transitory processor-readable storage medium 234), or could be at least one non-transitory processor-readable storage medium remote from the robot 200 (e.g. a remote server or device). To operate the robot in the first mode, the at least one processor 232 can access the first control mode from the at least one non-transitory processor-readable storage medium, and operate the robot in the accessed first control mode. The first control mode can include or be based on an AI, control paradigm, or control data (e.g. classifiers, action algorithms, etcetera).

At 904, a fault condition of the robot 200 during operation of the robot 200 in the first control mode is identified. Identification of the fault condition can be performed in many different ways. In some implementations, the robot 200 includes at least one sensor (e.g. any or all of sensors 220, 222, 224, or 226, or any other appropriate sensor). The at least one sensor captures sensor data representing an environment of the robot.

In one example, identifying a fault condition of the robot 200 comprises identifying, by the at least one processor 232 based on the sensor data, that the robot 200 has failed to complete an action to be performed by the robot 200. In a non-limiting example case, the robot 200 was supposed to pick up an apple, but the sensor data indicates that the robot 200 fumbled (dropped) the apple (e.g. based on visual data from an image sensor looking at the apple, or based on tactile data from at least one tactile sensor in a gripper member or hand of the robot 200, as non-limiting examples). The at least one processor 232 identifies this failure to pick up the apple as a fault condition of the robot 200.

In another example, identifying a fault condition of the robot 200 comprises identifying, by the at least one processor 232 based on the sensor data, that the robot 200 is unable to complete an action to be performed by the robot 200. In a non-limiting example case, the robot 200 was supposed to pick up an apple, but the at least one processor 232 of the robot is unable to locate the apple based on the sensor data. The at least one processor 232 identifies this inability to locate and pick up the apple as a fault condition of the robot.

In yet another example, identifying a fault condition of the robot 200 comprises identifying, by the at least one processor 232 based on the sensor data, that the robot 200 has improperly completed an action to be performed by the robot 200. In a non-limiting example case, the robot 200 was supposed to pick up an apple, but the sensor data indicates that the robot 200 crushed the apple (e.g. based on visual data from an image sensor looking at the apple, or based on tactile data from at least one tactile sensor in a gripper member or hand of the robot 200, as non-limiting examples). The at least one processor 232 identifies this improper picking up of the apple (application of too much force) as a fault condition of the robot.

In yet another example, identifying a fault condition of the robot 200 comprises identifying, by the at least one processor 232, that the at least one processor 232 is unable to determine an action or movement to be performed by the robot 200. In a non-limiting example case, the robot 200 may successfully pick up an apple, but may not be able to determine what to do next (e.g. what to do with the apple). The at least one processor 232 identifies this inability to determine a course of action as a fault condition of the robot 200.

In yet another example, identifying a fault condition of the robot 200 comprises identifying, by the at least one processor 232, that the at least one processor 232 is unable to determine an action or movement to be performed by the robot 200 with sufficient confidence to perform the determined action or movement. In a non-limiting example case, the robot 200 may successfully pick up an apple, but may not be able to confidently proceed with subsequent action. For example, the at least one processor 232 may identify a plurality of options for actions to perform with the apple (e.g. slice it, mash it, peel it, or give it to a human), but may not be able to decide which of the options is appropriate to act upon. Even if only one candidate action is identified, the at least one processor 232 may determine a confidence score for the action (e.g. level of confidence that the candidate action is appropriate, proper, or correct), and if the confidence score is below a threshold, the at least one processor 232 can identify this lack of confidence or decisiveness as a fault condition of the robot 200.

In yet another example, identifying a fault condition of the robot 200 comprises identifying, by the at least one processor 232, that the robot 200 has received operator input from the operator of the tele-operation system which indicates a fault condition of the robot 200. In a non-limiting example case, the robot 200 was supposed to pick up an apple, but instead picked up a pear. An operator of the tele-operation system may notice this, and provide input to the tele-operation system identifying the error as a fault condition of the robot 200. The tele-operation system can send an indication of the fault condition of the robot 200 to be received by the communication interface 240 of the robot 200. The at least one processor 232 of the robot can identify the fault condition by processed the received indication of the fault condition.

In response to identifying the fault condition of the robot 200 during operation of the robot 200 in the first mode, method 900 may further comprise outputting a fault indication by the robot 200. For example, the communication interface 240 may send the fault indication as a message to be received by the tele-operation system. As another example, the robot 200 may comprise an output device, such as an audio device (speaker) or a display device, and may output the fault indication by this output device (e.g., playing an alarm sound via the audio output device, or displaying an error message via the display device). As another example, the robot 200 may use a gesture as a fault indication. For example, in response to identifying a fault condition, the robot 200 may stop what it is doing and raise a hand to attract the attention of an operator.

At 906, in response to identifying the fault condition of the robot 200 during operation of the robot 200 in the first control mode, the control mode according to which the robot 200 is operated is changed from the first control mode to the second control mode. The at least one processor 232 can access data for the second control mode instead of the first control mode.

At 908, the robot 200 is operated in the second control mode. This operation can comprise the at least one processor 232 controlling decision making and action taking of robot 200. For example, similar to as described above regarding operation in the first control mode, at least one non-transitory processor-readable storage medium accessible to the at least one processor 232 (local or remote) can store the plurality of control modes. To operate the robot in the second mode, the at least one processor 232 can access the second control mode from the at least one non-transitory processor-readable storage medium, and operate the robot 200 in the accessed second control mode. The second control mode can include or be based on an AI, control paradigm, or control data (e.g. classifiers, action algorithms, etcetera).

Several different exemplary implementations for the first level of robot autonomy, the second level of robot autonomy, the first control mode, and the second control mode are discussed in detail below. Discussion of optional acts 910, 912, and 914 of method 900 follows thereafter.

For a first exemplary implementation of method 900, the first level of robot autonomy comprises full robot autonomy (FA). This means that, within a certain scope available to the robot 200, the robot 200 is able to operate in the first control mode in act 902 without requiring input from the operator of the tele-operation system. As discussed earlier, the robot 200 is still open to receiving feedback and input from an operator (e.g. for training purposes), and can still receive instructions from the operator to shift scope or define a new scope. In this first exemplary implementation of method 900, the second level of robot autonomy comprises partial robot autonomy, and operating the robot 200 in the second control mode in act 908 comprises operating the robot 200 based on at least one action instruction from the operator of the tele-operation system received by the communication interface, the at least one action instruction indicating at least one action to be performed by the robot 200. "Partial robot autonomy" can refer to HLT operation of the robot 200, such that the second control mode corresponds to an HLT control mode as discussed above. Further, the description of "action instructions" above with reference to FIGS. 5 and 6 is fully applicable to the second control mode in this first exemplary implementation.

Further for the first exemplary implementation of method 900, the plurality of control modes can further include a third control mode that corresponds to a third level of robot autonomy, the third level of robot autonomy being less autonomous than the second level of robot autonomy. The third level of robot autonomy can comprise no robot autonomy, where operation of the robot 200 in the third control mode is based on at least one movement instruction from the operator of the tele-operation system received by the communication interface, the at least one movement instruction indicating at least one movement to be emulated by at least one actuatable member of the robot 200. "No robot autonomy" can refer to LLT operation of the robot, such that the third control mode corresponds to an LLT control mode as discussed above. Further, the description of "movement instructions" above with reference to FIGS. 1 and 2 is fully applicable to the third control mode in this first exemplary implementation.

In the first exemplary implementation of method 900, the first control mode can correspond to an FA control mode, the second control mode can correspond to an HLT control mode, and the optional third control mode can correspond to an LLT control mode. Further, the first level of robot autonomy can correspond to full robot autonomy, the second level of robot autonomy can correspond to partial robot autonomy, and the third level of robot autonomy can correspond to no robot autonomy. In this exemplary implementation, the robot 200 operates in the first control mode (FA control mode), but if a fault condition is identified, the robot 200 changes to operate in the second control mode (HLT control mode). This allows an operator to resolve a fault condition of the robot 200 in an HLT control mode, with the possibility to change to an LLT control mode if necessary (as discussed later with reference to acts 910, 912, and 914).

For a second exemplary implementation of method 900, the first level of robot autonomy comprises full robot autonomy (FA), similarly to the first exemplary implementation of method 900. Further in this second exemplary implementation of method 900, the second level of robot autonomy comprises no robot autonomy, and operating the robot 200 in the second control mode in act 908 comprises operating the robot 200 based on at least one movement instruction from the operator of the tele-operation system received by the communication interface, the at least one movement instruction indicating at least one movement to be emulated by at least one actuatable member of the robot 200. "No robot autonomy" can refer to LLT operation of the robot 200, such that the second control mode corresponds to an LLT control mode as discussed above. Further, the description of "movement instructions" above with reference to FIGS. 1 and 2 is fully applicable to the second control mode in this second exemplary implementation.

Further for the second exemplary implementation of method 900, the plurality of control modes can further include a third control mode that corresponds to a third level of robot autonomy, the third level of robot autonomy being less autonomous than the first level of robot autonomy and more autonomous than the second level of robot autonomy. The third level of robot autonomy can comprise partial robot autonomy, where operation of the robot 200 in the third control mode is based on at least one action instruction from the operator of the tele-operation system received by the communication interface, the at least one action instruction indicating at least one action to be performed by the robot 200. "Partial robot autonomy" can refer to HLT operation of the robot 200, such that the third control mode corresponds to an HLT control mode as discussed above. Further, the description of "action instructions" above with reference to FIGS. 5 and 6 is fully applicable to the third control mode in this second exemplary implementation.

In the second exemplary implementation of method 900, the first control mode can correspond to an FA control mode, the second control mode can correspond to an LLT control mode, and the optional third control mode can correspond to an HLT control mode. Further, the first level of robot autonomy can correspond to full robot autonomy, the second level of robot autonomy can correspond to no robot autonomy, and the third level of robot autonomy can correspond to partial robot autonomy. In this exemplary implementation, the robot 200 operates in the first control mode (FA control mode), but if a fault condition is identified, the robot 200 changes to operate in the second control mode (LLT control mode). That is, the HLT control mode is skipped over, and the robot 200 goes directly from FA control mode to LLT control mode. This can be useful for example if no HLT operators are available, but an LLT operator is available. With reference to the example of FIG. 8, if a fault condition is identified in one of robots 810, and tele-operation system 840 determines that all tele-operation systems 820 are preoccupied, but a tele-operation system 830 is available, the robot 200 can change to an LLT control mode, to receive operator input from an LLT tele-operation system 830.

For a third exemplary implementation of method 900, the first level of robot autonomy comprises partial robot autonomy, and operating the robot 200 in the first control mode in act 902 comprises operating the robot 200 based on at least one action instruction from the operator of the tele-operation system received by the communication interface, the at least one action instruction indicating at least one action to be performed by the robot 200. "Partial robot autonomy" can refer to HLT operation of the robot 200, such that the first control mode corresponds to an HLT control mode as discussed above. Further, the description of "action instructions" above with reference to FIGS. 5 and 6 is fully applicable to the first control mode in this third exemplary implementation. Further in this third exemplary implementation of method 900, the second level of robot autonomy comprises no robot autonomy, and operating the robot in the second control mode in act 908 comprises operating the robot 200 based on at least one movement instruction from the operator of the tele-operation system received by the communication interface, the at least one movement instruction indicating at least one movement to be emulated by at least one actuatable member of the robot 200. "No robot autonomy" can refer to LLT operation of the robot 200, such that the second control mode corresponds to an LLT control mode as discussed above. Further, the description of "movement instructions" above with reference to FIGS. 1 and 2 is fully applicable to the second control mode in this third exemplary implementation.

Further for the third exemplary implementation of method 900, the plurality of control modes can further include a third control mode that corresponds to a third level of robot autonomy, the third level of robot autonomy being more autonomous than the first level of robot autonomy. The third level of robot autonomy can comprise full robot autonomy (FA); the description of full robot autonomy in the first exemplary implementation of method 900 above is applicable to full robot autonomy in this third exemplary implementation of method 900.

In the third exemplary implementation of method 900, the first control mode can correspond to an HLT control mode, the second control mode can correspond to an LLT control mode, and the optional third control mode can correspond to an FA control mode. Further, the first level of robot autonomy can correspond to partial robot autonomy, the second level of robot autonomy can correspond to no robot autonomy, and the third level of robot autonomy can correspond to full robot autonomy. In this exemplary implementation, the robot 200 operates in the first control mode (HLT control mode), but if a fault condition is identified, the robot 200 changes to operate in the second control mode (LLT control mode). This allows an operator to resolve a fault condition of the robot 200 in an LLT control mode, where instructions provided in the HLT control mode were not sufficiently explicit to avoid the fault condition.

Method 900 as illustrated in FIG. 9 includes optional acts 910, 912, and 914 discussed below. For implementations which include these optional acts, the plurality of control modes further includes a third control mode that corresponds to a third level of robot autonomy, the third level of robot autonomy being less autonomous than the second level of robot autonomy.

At 910, another fault condition of the robot 200 during operation of the robot 200 in the second control mode is identified. The discussion above with reference to act 904, regarding identification of fault conditions, is fully applicable to identification of fault conditions in act 910, and is not repeated for brevity.

At 912, in response to identifying the another fault condition during operation of the robot 200 in the second control mode, the control mode according to which the robot 200 is being operated is changed from the second control mode to the third control mode. The at least one processor 232 can access data for the third control mode instead of the second control mode.

At 914, the robot 200 is operated in the third control mode. This operation can comprise the at least one processor 232 controlling decision making and action taking of robot 200. For example, similar to as described above regarding operation in the first control mode, at least one non-transitory processor-readable storage medium accessible to the at least one processor 232 (local or remote) can store the plurality of control modes. To operate the robot 200 in the third mode, the at least one processor 232 can access the third control mode from the at least one non-transitory processor-readable storage medium 234, and operate the robot in the accessed third control mode. The third control mode can include or be based on an AI, control paradigm, or control data. In cases where the control mode corresponds to an LLT control mode where the robot 200 has no robot autonomy, operating the robot 200 in the third mode can comprise converting at least one movement instruction received from the tele-operation system to drive signals for actuating at least one actuatable member of the robot 200.

In an exemplary implementation of method 900 including optional acts 910, 912, and 914, the first control mode corresponds to an FA control mode, the second control mode corresponds to an HLT control mode, and the third control mode corresponds to an LLT control mode. Further, the first level of robot autonomy corresponds to full robot autonomy, the second level of robot autonomy corresponds to partial robot autonomy, and the third level of robot autonomy corresponds to no robot autonomy. In this exemplary implementation, the robot 200 operates in the first control mode (FA control mode), but if a fault condition is identified, the robot 200 changes to operate in the second control mode (HLT control mode). If a further fault condition is detected during operation in the second control mode (i.e., if HLT control mode is insufficient to address a fault or faults which the robot 200 is facing), the robot 200 changes to operate in the third control mode (LLT control mode), which provides an operator explicit control over movements of the robot 200, in order to resolve the scenario which is causing the fault conditions.

As mentioned above, method 900 can further comprise training the first control mode based on at least input from the operator of the tele-operation system received for operating the robot 200 in the second control mode. Similarly, method 900 can further comprise training the second control mode based on at least input from the operator of the tele-operation system received for operating the robot 200 in the third control mode (in the case where the robot 200 is operated in the third control mode).

Figure 10:
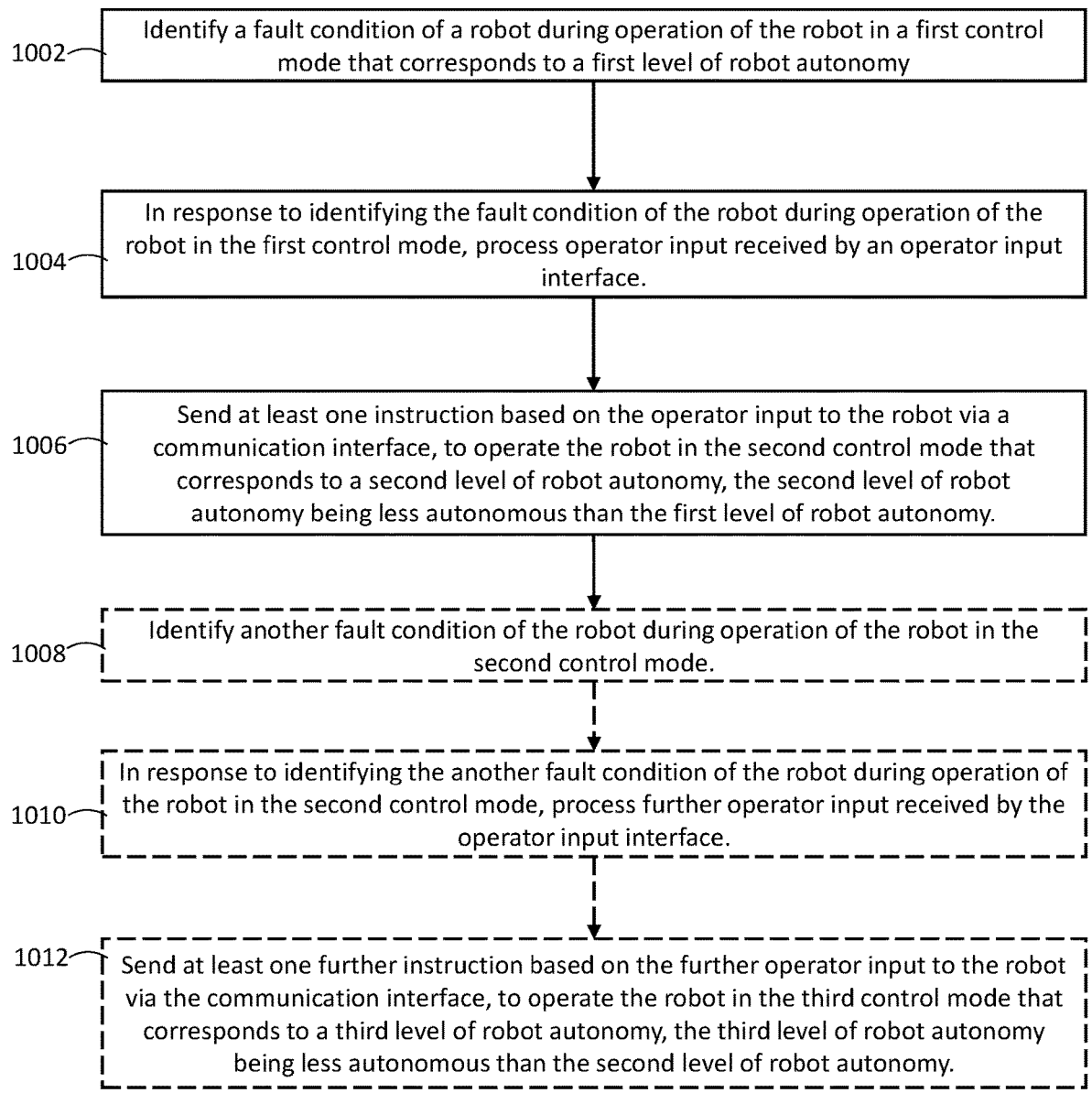
FIG. 10 is a flowchart diagram which illustrates a method for operating a tele-operation system.

FIG. 10 is a flowchart diagram showing an exemplary method 1000 of operating a tele-operation system in accordance with the present disclosure. Method 1000 as illustrated includes acts 1002, 1004, 1006, 1008, 1010, and 1012, though those of skill in the art will appreciate that in alternative implementations certain acts may be omitted and/or additional acts may be added. Acts 1008, 1010, and 1012 in particular are shown in dashed lines to highlight that these acts are optional. Those of skill in the art will also appreciate that the illustrated order of the acts is shown for exemplary purposes only and may change in alternative implementations.

The acts of method 1000 are described from the perspective of a tele-operation system which communicates with a robot (such as robot 200 in FIG. 2, robot 300 in FIG. 3, robot 400 in FIG. 4, robot 710 in FIG. 7, any of robots 810 in FIG. 8, or any other appropriate robot). The tele-operation system could for example comprise tele-operation system 500 in FIG. 5, input controller 600 in FIG. 6, tele-operation system 720 in FIG. 7, tele-operation system 730 in FIG. 7, any of tele-operation systems 820 in FIG. 8, any of tele-operation systems 830 in FIG. 8, tele-operation system 840 in FIG. 8, or any other appropriate tele-operation system. Further, in the context of method 1000, the "tele-operation system" could include a plurality of tele-operation systems. For example, the tele-operation system in method 1000 could comprise both of tele-operation system 720 and tele-operation system 730 in FIG. 7. As another example, the tele-operation system in method 1000 could comprise each of tele-operations systems 820 and tele-operation system 830 in FIG. 8 (as tele-operation system 840). The robot operated by the tele-operation system could comprise any of the robots discussed herein, such as robot 200 in FIG. 2, though other robots with similar hardware could be used instead (such as robot 300 in FIG. 3, robot 400 in FIG. 4, robot 710 in FIG. 7, or any of robots 810 in FIG. 8).

The tele-operation system comprises at least one processor and a communication interface that communicatively couples the at least one processor to the robot. Further, the tele-operation system can comprise a non-transitory processor-readable storage medium communicatively coupled to the at least one processor. The at least one processor-readable storage medium can store processor-executable instructions which, when executed by the at least one processor, cause the tele-operation system to perform method 1000. In some implementations, the acts of method 1000 can be comprised in a computer program product stored on a non-transitory processor-readable storage medium. The computer program product comprises processor-executable instructions or data that, when the computer program product is executed by at least one processor of the tele-operation system, the tele-operation system is caused to perform the acts of method 1000. The tele-operation system further includes an operator input interface, such as those discussed above with reference to FIGS. 5 and 6, or any other appropriate operator input interface by which input from an operator is received. References to "the at least one processor", "the at least one non-transitory processor-readable storage medium" or "the communication Interface" in the context of method 1000 refer to the respective components of the tele-operation system.

The robot which is communicatively coupled to the tele-operation system in accordance with method 1000 is selectively operable between a plurality of control modes that include a first control mode that corresponds to a first level of robot autonomy, and at least a second control mode that corresponds to a second level of robot autonomy, the second level of robot autonomy being less autonomous than the first level of robot autonomy. The plurality of control modes could include additional control modes (e.g. a third control mode), as is discussed later. Control modes of the plurality of the control modes could correspond to an FA control mode, an HLT control mode, or an LLT control mode, as appropriate for a given application. Alternatively, control modes of the plurality of control modes could correspond to other defined control modes, as appropriate for a given application. Generally, instructions sent to the robot from the tele-operation system to operate the robot in the second control mode are based on more explicit input from an operator of the tele-operation system than for operation of the robot in the first control mode.

At 1002, a fault condition of the robot during operation of the robot in the first control mode is identified. Identification of the fault condition can be performed in many different ways. Several ways for identifying a fault condition of the robot, by the robot, are discussed above with reference to act 904 of method 900. Where the robot identifies a fault condition of the robot, the robot can send fault data indicating the fault condition of the robot to the tele-operation system. The tele-operation system receives the fault data via the communication interface, and identifies the fault condition as indicated in the fault data. Thus, act 1002 in method 1000 can include identifying the fault condition based on fault data from the robot which indicates the fault condition. The fault data can indicate a fault condition identified by any of the ways discussed above with reference to act 904 of method 900.

In another example, identifying a fault condition of the robot comprises identifying, by the at least one processor, that the operator input interface of the tele-operation system has received operator input from the operator of the tele-operation system which indicates a fault condition of the robot. In a non-limiting example case, the robot was supposed to pick up an apple, but instead picked up a pear. An operator of the tele-operation system may notice this, and provide operator input indicating the error as a fault condition of the robot. The at least one processor can process this operator input to identify the fault condition of the robot.

In yet another example, the tele-operation system may be communicatively coupled to a robot surveillance system which monitors activity of the robot (for example, a camera system which views the robot). In this example, identifying a fault condition of the robot comprises identifying, by the at least one processor, that the operator input interface has received surveillance input from the robot surveillance system indicating a fault condition of the robot. In a non-limiting example case, the robot was supposed to pick up an apple, but instead picked up a pear. This error may be identified by the robot surveillance system, which then provides surveillance input to the tele-operation system which indicates a fault condition of the robot. The at least one processor can process this surveillance input to identify the fault condition of the robot.

At 1004, in response to identifying the fault condition of the robot during operation of the robot in the first control mode, the tele-operation system processes operator input received by an operator interface. In this case, processing operator input refers to the operator input interface receiving input from an operator, and the at least one processor of the tele-operation system handling and interpreting the input.

At 1006, at least one instruction based on the operator input is sent to the robot via the communication interface, to operate the robot in the second control mode. That is, the tele-operation system sends at least one instruction to the robot to change control mode of the robot. The tele-operation system can then send any instructions needed to operate the robot in the new control mode (e.g. HLT or LLT level instructions).

Several different exemplary implementations for the first level of robot autonomy, the second level of robot autonomy, the first control mode, and the second control mode are discussed in detail below. Discussion of optional acts 1008, 1010, and 1012 of method 1000 follows thereafter.

For a first exemplary implementation of method 1000, the first level of robot autonomy comprises full robot autonomy (FA). This description of an FA control mode above with reference to method 900 is fully applicable to method 1000 as well. In this first exemplary implementation of method 1000, the second level of robot autonomy comprises partial robot autonomy, and sending at least one instruction based on the operator input to the robot in act 1006 comprises: sending at least one action instruction from the tele-operation system to the robot, the at least one action instruction indicating at least one action to be performed by the robot, as received by the operator input interface from the operator of the tele-operation system. That is, the operator inputs, via the operator input interface, at least one action to be performed by the robot, and a corresponding action instruction is sent to the robot for operation of the robot in the second control mode. "Partial robot autonomy" can refer to HLT operation of the robot, such that the second control mode corresponds to an HLT control mode as discussed above. Further, the description of "action instructions" above with reference to FIGS. 5 and 6 is fully applicable to the second control mode in this first exemplary implementation.

Further for the first exemplary implementation of method 1000, the plurality of control modes can further include a third control mode that corresponds to a third level of robot autonomy, the third level of robot autonomy being less autonomous than the second level of robot autonomy. Instructions sent to the robot from the tele-operation system to operate the robot in the third control mode are based on more explicit input from the operator than instructions sent to the robot from the tele-operation system for operation of the robot in the second control mode. The third level of robot autonomy can comprise no robot autonomy, and instructions sent to the robot from the tele-operation system to operate the robot in the third control mode include at least one movement instruction from the operator of the tele-operation system received by the operator input interface, the at least one movement instruction indicating at least one movement to be emulated by at least one actuatable member of the robot. "No robot autonomy" can refer to LLT operation of the robot, such that the third control mode corresponds to an LLT control mode as discussed above. Further, the description of "movement instructions" above with reference to FIGS. 1 and 2 is fully applicable to the third control mode in this first exemplary implementation.

In the first exemplary implementation of method 1000, the first control mode can correspond to an FA control mode, the second control mode can correspond to an HLT control mode, and the optional third control mode can correspond to an LLT control mode. Further, the first level of robot autonomy can correspond to full robot autonomy, the second level of robot autonomy can correspond to partial robot autonomy, and the third level of robot autonomy can correspond to no robot autonomy. In this exemplary implementation, the robot operates in the first control mode (FA control mode), but if a fault condition is identified, the tele-operation system sends at least one instruction to operate the robot in the second control mode (HLT control mode). This allows an operator to resolve a fault condition of a robot in an HLT control mode, with the possibility to change to an LLT control mode if necessary (as discussed later with reference to acts 1008, 1010, and 1012).

For a second exemplary implementation of method 1000, the first level of robot autonomy comprises full robot autonomy (FA), similarly to the first exemplary implementation of method 1000. Further in this second exemplary implementation of method 1000, the second level of robot autonomy comprises no robot autonomy, and instructions sent to the robot from the tele-operation system to operate the robot in the second control mode in act 1006 include at least one movement instruction from the operator of the tele-operation system received by the operator input interface, the at least one movement instruction indicating at least one movement to be emulated by at least one actuatable member of the robot. "No robot autonomy" can refer to LLT operation of the robot, such that the second control mode corresponds to an LLT control mode as discussed above. Further, the description of "movement instructions" above with reference to FIGS. 1 and 2 is fully applicable to the second control mode in this second exemplary implementation.

Further for the second exemplary implementation of method 1000, the plurality of control modes can further include a third control mode that corresponds to a third level of robot autonomy, the third level of robot autonomy being less autonomous than the first level of robot autonomy and more autonomous than the second level of robot autonomy. Instructions sent to the robot from the tele-operation system to operate the robot in the third control mode are based on less explicit input from the operator than instructions sent to the robot from the tele-operation system for operation of the robot in the second control mode. Instructions sent to the robot from the tele-operation system to operate the robot in the third control mode are based on more explicit input from the operator than for operation of the robot in the first control mode. The third level of robot autonomy can comprise partial robot autonomy, and instructions sent to the robot from the tele-operation system to operate the robot in the third control mode include at least one action instruction indicating at least one action to be performed by the robot as received by the operator input interface from the operator of the tele-operation system. "Partial robot autonomy" can refer to HLT operation of the robot, such that the third control mode corresponds to an HLT control mode as discussed above. Further, the description of "action instructions" above with reference to FIGS. 5 and 6 is fully applicable to the third control mode in this first exemplary implementation.

In the second exemplary implementation of method 1000, the first control mode can correspond to an FA control mode, the second control mode can correspond to an LLT control mode, and the optional third control mode can correspond to an HLT control mode. Further, the first level of robot autonomy can correspond to full robot autonomy, the second level of robot autonomy can correspond to no robot autonomy, and the third level of robot autonomy can correspond to partial robot autonomy. In this exemplary implementation, the robot operates in the first control mode (FA control mode), but if a fault condition is identified, at least one instructions is sent from the tele-operation system to operate the robot in the second control mode (LLT control mode). That is, the HLT control mode is skipped over, and the robot goes directly from FA control mode to LLT control mode. This can be useful for example if no HLT operators are available, but an LLT operator is available. With reference to the example of FIG. 8, if a fault condition is identified in one of robots 810, and tele-operation system 840 determines that all tele-operation systems 820 are preoccupied, but a tele-operation system 830 is available, the robot 200 can be instructed to change to an LLT control mode, to receive operator input from an LLT tele-operation system 830.

For a third exemplary implementation of method 1000, the first level of robot autonomy comprises partial robot autonomy, and instructions sent to the robot from the tele-operation system to operate the robot in the first control mode include at least one action instruction indicating at least one action to be performed by the robot, as received by the operator input interface from the operator of the tele-operation system. "Partial robot autonomy" can refer to HLT operation of the robot, such that the first control mode corresponds to an HLT control mode as discussed above. Further, the description of "action instructions" above with reference to FIGS. 5 and 6 is fully applicable to the first control mode in this third exemplary implementation. Further in this third exemplary implementation of method 1000, the second level of robot autonomy comprises no robot autonomy, and sending the at least one instruction based on the operator input to the robot in act 1006 comprises: sending at least one movement instruction to the robot via the communication interface, the at least one movement instruction indicating at least one movement to be emulated by at least one actuatable member of the robot as received by the operator input interface from the operator of the tele-operation system. "No robot autonomy" can refer to LLT operation of the robot, such that the second control mode corresponds to an LLT control mode as discussed above. Further, the description of "movement instructions" above with reference to FIGS. 1 and 2 is fully applicable to the second control mode in this third exemplary implementation.

Further for the third exemplary implementation of method 1000, the plurality of control modes can further include a third control mode that corresponds to a third level of robot autonomy, the third level of robot autonomy being more autonomous than the first level of robot autonomy. The third level of robot autonomy can comprise full robot autonomy (FA); the description of full robot autonomy in the first exemplary implementation of method 900 above is applicable to full robot autonomy in this third exemplary implementation of method 1000.

In the third exemplary implementation of method 1000, the first control mode can correspond to an HLT control mode, the second control mode can correspond to an LLT control mode, and the optional third control mode can correspond to an FA control mode. Further, the first level of robot autonomy can correspond to partial robot autonomy, the second level of robot autonomy can correspond to no robot autonomy, and the third level of robot autonomy can correspond to full robot autonomy. In this exemplary implementation, the robot operates in the first control mode (HLT control mode), but if a fault condition is identified, the tele-operation system sends at least one instruction to operate the robot in the second control mode (LLT control mode). This allows an operator to resolve a fault condition of a robot in an LLT control mode, where instructions provided in the HLT control mode were not sufficiently explicit to avoid the fault condition.

Method 1000 as illustrated in FIG. 10 includes optional acts 1008, 1010, and 1012 discussed below. For implementations which include these optional acts, the plurality of control modes further includes a third control mode that corresponds to a third level of robot autonomy, the third level of robot autonomy being less autonomous than the second level of robot autonomy.

At 1008, another fault condition of the robot during operation of the robot in the second control mode is identified. The discussion above with reference to act 1002, regarding identification of fault conditions, is fully applicable to identification of fault conditions in act 1008, and is not repeated for brevity.

At 1010, in response to identifying the another fault condition during operation of the robot in the second control mode, further operator input is received by the operator input and processed. In this case, processing further operator input refers to the operator input interface receiving further input from an operator, and the at least one processor of the tele-operation system handling and interpreting the input.

At 1012, the tele-operation system sends at least one further instruction based on the further operator input to the robot via the communication interface, to operate the robot in the third control mode. That is, the tele-operation system sends at least one instruction to the robot to change control mode of the robot again. The tele-operation system can then send any instructions needed to operate the robot in the new control mode (e.g. LLT level instructions).

In an exemplary implementation of method 1000 including optional acts 1008, 1010, and 1012, the first control mode corresponds to an FA control mode, the second control mode corresponds to an HLT control mode, and the third control mode corresponds to an LLT control mode. Further, the first level of robot autonomy corresponds to full robot autonomy, the second level of robot autonomy corresponds to partial robot autonomy, and the third level of robot autonomy corresponds to no robot autonomy. In this exemplary implementation, the robot operates in the first control mode (FA control mode), but if a fault condition is identified, the tele-operation system sends at least one instruction to operate the robot in the second control mode (HLT control mode). If a further fault condition is detected during operation in the second control mode (i.e., if HLT control mode is insufficient to address a fault or faults which the robot is facing), the tele-operation system sends at least one further instruction to operate the robot in the third control mode (LLT control mode), which provides an operator explicit control over movements of the robot, in order to resolve the scenario which is causing the fault conditions.

As mentioned above, method 1000 can further comprise training the first control mode based on at least input from the operator of the tele-operation system received for operating the robot in the second control mode. Similarly, method 1000 can further comprise training the second control mode based on at least input from the operator of the tele-operation system received for operating the robot in the third control mode (in the case where the robot is operated in the third control mode).

Methods 900 and 1000 discussed above include acts of changing an operation control mode of a robot (or sending instructions to operate the robot in a different control mode), in response to identification of a fault condition of the robot. The above discussion of identification of a fault condition can be interpreted such that control mode of the robot is changed after identification of the robot being unable to sufficiently or properly perform or decide one action. However, this is not always the case. In some implementations, despite identification of the robot being unable to sufficiently or properly perform or decide one action, the robot may try (or be allowed to try) again prior to a fault condition being identified. For example, a robot may be given a certain amount of "tries" to perform a task before the failure is identified as a fault condition, where the control mode is changed and operator input is processed. Further, a robot may be allowed to "fail" or "inappropriately" perform a task, but a fault condition may only be identified if failure of a certain magnitude occurs. For example, a robot may perform a task "inappropriately" by performing the task in a slow or inefficient manner, but the task is still completed. In such a case, a fault condition may not be identified. Alternatively, a fault condition may not be identified (or may be identified but not acted upon) unless there is an available tele-operation system to provide input to train the robot to be more efficient. That is, tele-operation systems may be limited in number, and fault conditions of high gravity (e.g. complete failure to perform tasks, performing tasks dangerously, etcetera) may be prioritized for control by a tele-operation system.

The robot systems, methods, control modules, and computer program products described herein may, in some implementations, employ any of the teachings of U.S. patent application Ser. No. 17/566,589; U.S. patent application Ser. No. 17/883,737; U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. Provisional Patent Application Ser. No. 63/001,755 (Publication No. US 2021-0307170 A1), and/or U.S. Provisional Patent Application Ser. No. 63/057,461, as well as U.S. Provisional Patent Application Ser. No. 63/151,044, U.S. Provisional Patent Application Ser. No. 63/173,670, U.S. Provisional Patent Application Ser. No. 63/184,268, U.S. Provisional Patent Application Ser. No. 63/213,385, U.S. Provisional Patent Application Ser. No. 63/232,694, U.S. Provisional Patent Application Ser. No. 63/253,591, U.S. Provisional Patent Application Ser. No. 63/293,968, U.S. Provisional Patent Application Ser. No. 63/293,973, U.S. Provisional Patent Application Ser. No. 63/278,817, and/or U.S. patent application Ser. No. 17/566,589, each of which is incorporated herein by reference in its entirety.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "processing unit" (or alternately, a "processor") is a device which can execute instructions, logic, or programs, to perform various acts or manipulations of data. A processing unit can for example be implemented as application-specific integrated circuit(s) (i.e., ASICs), field-programmable gate arrays (FPGAs), programmable logic devices (PLDs), logic circuits, or any other appropriate hardware which can receive and process (act on or manipulate) data.

Throughout this specification and the appended claims, a "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of operation of a fleet of robots, each robot in the fleet of robots having a respective at least one processor and a respective communication interface that communicatively couples the at least one processor to a teleoperation system, the method comprising:
respectively operating each robot in the fleet of robots in a full autonomy mode;
while each robot in the fleet of robots is respectively operating in the full autonomy mode, identifying, by the at least one processor of a first robot in the fleet of robots, a first fault condition of the first robot;
in response to identifying the first fault condition of the first robot:
continuing to respectively operate in the full autonomy mode each robot in the fleet of robots other than the first robot; and
changing, by the at least one processor of the first robot, a control mode of the first robot to a graphical user interface (GUI) control mode having less robot autonomy than the full autonomy mode;
transmitting, by the communication interface of the first robot, a request for GUI-based action instructions;
receiving, by the communication interface of the first robot, GUI-based action instructions from the teleoperation system;
executing the GUI-based action instructions by the first robot;
while the first robot is executing the GUI-based action instructions, identifying a second fault condition of the first robot, the second fault condition indicating that the first fault condition has not been resolved;
in response to identifying the second fault condition of the first robot:
continuing to respectively operate in the full autonomy mode each robot in the fleet of robots other than the first robot; and
changing the control mode of the first robot to an analogous teleoperation control mode having no robot autonomy;
transmitting, by the communication interface of the first robot, a request to the teleoperation system for analogous teleoperation-based action instructions;
receiving, by the communication interface of the first robot, analogous teleoperation-based action instructions from the teleoperation system;

executing the analogous teleoperation action instructions by the first robot;
training the GUI control mode based on the analogous teleoperation action instructions to increase a level of robot autonomy of the GUI control mode; and
training the full autonomy mode based on both the analogous teleoperation instructions and the GUI-based action instructions.

2. The method of claim 1, further comprising:
identifying that the second fault condition of the first robot is resolved;
changing the control mode of the first robot back to the full autonomy mode; and
continuing to respectively operate in the full autonomy mode each robot in the fleet of robots including the first robot.

3. The method of claim 1, wherein the GUI control mode includes a point-and-click interface and the GUI-based action instructions include action instructions selected from the point and click interface by a teleoperator.

4. The method of claim 1, wherein the analogous teleoperation control mode includes a teleoperator wearing a plurality of motion sensors that correspond to different anatomical regions of the teleoperator and capture motion data for the different anatomical regions, and wherein the analogous teleoperation-based action instructions include movement instructions for the first robot to emulate actual movements of the teleoperator detected by the motion sensors.

5. The method of claim 1, wherein identifying, by the at least one processor of a first robot in the fleet of robots, a first fault condition of the first robot includes identifying, by the at least one processor of the first robot, that the first robot is unable to determine an action to perform in the full autonomy mode.

6. The method of claim 1, wherein identifying, by the at least one processor of a first robot in the fleet of robots, a first fault condition of the first robot includes identifying, by the at least one processor of the first robot, that the first robot is unable to complete an action in the full autonomy mode.

7. The method of claim 1, wherein while the first robot is executing the GUI-based action instructions, identifying a second fault condition of the first robot includes identifying, by the at least one processor of the first robot, the second fault condition of the first robot.

8. The method of claim 1, wherein the teleoperation system comprises a number of GUI-based teleoperation subsystems that is less than a number of robots in the fleet of robots, and wherein receiving, by the communication interface of the first robot, GUI-based action instructions from the teleoperation system includes receiving, by the communication interface of the first robot, GUI-based action instructions from a first GUI-based teleoperation subsystem in the number of GUI-based teleoperation subsystems.

9. The method of claim 8, further comprising:
while each robot in the fleet of robots other than the first robot is respectively operating in the full autonomy mode, identifying, by the at least one processor of a second robot in the fleet of robots, a first fault condition of the second robot;
in response to identifying the first fault condition of the second robot:
continuing to respectively operate in the full autonomy mode each robot in the fleet of robots other than the first robot and the second robot; and
changing, by the at least one processor of the second robot, a control mode of the second robot to the GUI control mode;
transmitting, by the communication interface of the second robot, a request for GUI-based action instructions for the second robot;
receiving, by the communication interface of the second robot, GUI-based action instructions for the second robot from a second GUI-based teleoperation subsystem in the number of GUI-based teleoperation subsystems;
executing the GUI-based action instructions for the second robot by the second robot.

10. The method of claim 9, wherein the teleoperation system comprises a number of analogous teleoperation-based subsystems that is less than the number of GUI-based teleoperation subsystems, and wherein receiving, by the communication interface of the first robot, analogous teleoperation-based action instructions from the teleoperation system includes receiving, by the communication interface of the first robot, analogous teleoperation-based action instructions from a first analogous teleoperation-based subsystem in the number of analogous teleoperation-based subsystems.

11. The method of claim 10, further comprising:
while the second robot is executing the GUI-based action instructions for the second robot, identifying a second fault condition of the second robot;
in response to identifying the second fault condition of the second robot:
continuing to respectively operate in the full autonomy mode each robot in the fleet of robots other than the first robot and the second robot; and
changing the control mode of the second robot to the analogous teleoperation control mode;
transmitting, by the communication interface of the second robot, a request to the teleoperation system for analogous teleoperation-based action instructions for the second robot;
receiving, by the communication interface of the second robot, analogous teleoperation-based action instructions for the second robot from a second analogous teleoperation-based subsystem in the number of analogous teleoperation-based subsystems; and
executing the analogous teleoperation action instructions for the second robot by the second robot.

12. The method of claim 1, wherein identifying a second fault condition of the first robot includes identifying that the first robot is unable to execute at least one action specified in the GUI-based action instructions.

* * * * *